United States Patent
Tischer

[19]

[11] Patent Number: 5,878,622

[45] Date of Patent: Mar. 9, 1999

[54] ACTUATING DEVICE FOR AUTOMATICALLY OPERATING MANUAL TRANSMISSIONS OF VEHICLES

[75] Inventor: Dieter Tischer, Wendlingen, Germany

[73] Assignee: Hydraulik—Ring Antriebs- und Steuerungstechnik GmbH, Nurtingen, Germany

[21] Appl. No.: 804,730

[22] Filed: Feb. 21, 1997

[30] Foreign Application Priority Data

Feb. 23, 1996 [DE] Germany .................. 196 06 756.1

[51] Int. Cl.[6] .................................................. B60K 20/02
[52] U.S. Cl. ........................................ 74/335; 74/473.11
[58] Field of Search ................ 74/335, 473.11, 74/473.34

[56] References Cited

U.S. PATENT DOCUMENTS

| | | | |
|---|---|---|---|
| 2,178,061 | 10/1939 | Bachman et al. | 74/473.11 |
| 2,487,116 | 11/1949 | Eaton | 74/335 |
| 3,053,102 | 9/1962 | Alfieri | 74/335 |
| 3,074,291 | 1/1963 | Alfieri | 74/335 |
| 3,407,676 | 10/1968 | Magg | 74/335 |
| 4,287,784 | 9/1981 | Cedendahl | 74/473.11 |
| 4,899,607 | 2/1990 | Stainton | 74/335 |
| 4,936,156 | 6/1990 | Peterson et al. | 74/473.11 |

*Primary Examiner*—Dirk Wright
*Attorney, Agent, or Firm*—Robert W. Becker & Associates

[57] ABSTRACT

An actuating device for automatically operating a manual transmission of a vehicle includes at least two gear and shift actuators for moving by rotation and translatory movement a selector shaft of a manual transmission in order to select a gate and a gear of the manual transmission. Each one of the gear and shift actuators includes a first piston that upon displacement moves by rotation or translatory movement the selector shaft.

34 Claims, 19 Drawing Sheets

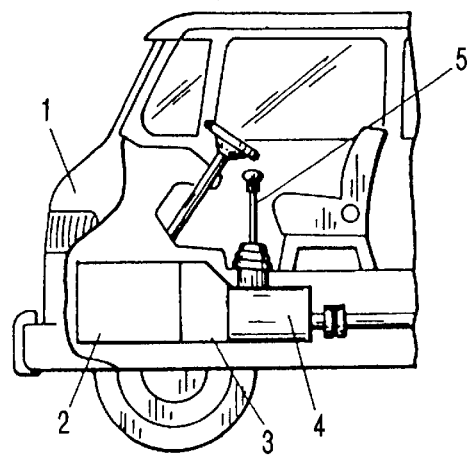
FIG-1
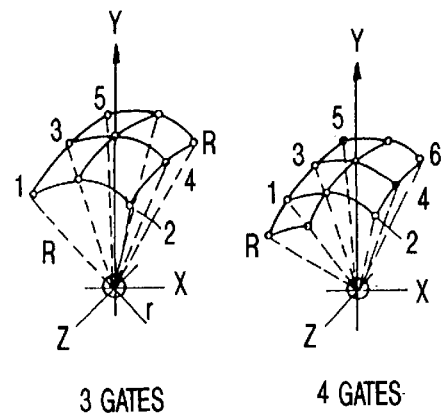
3 GATES
FIG-2a
4 GATES
FIG-2b
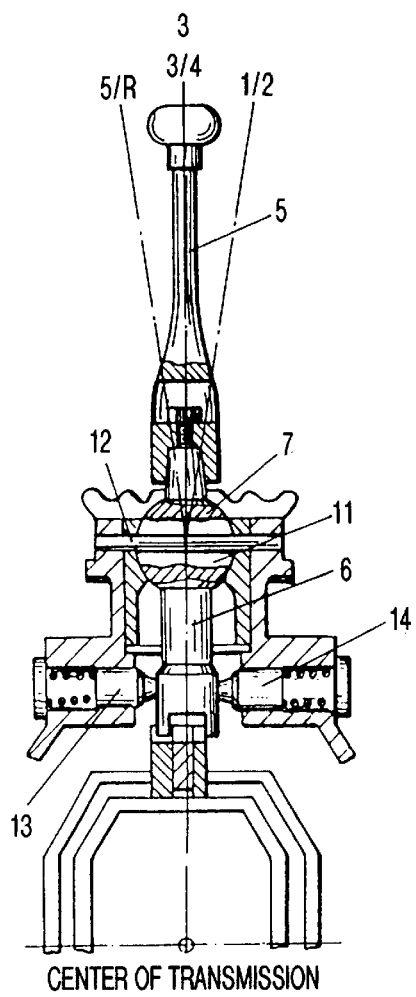
FIG-3a
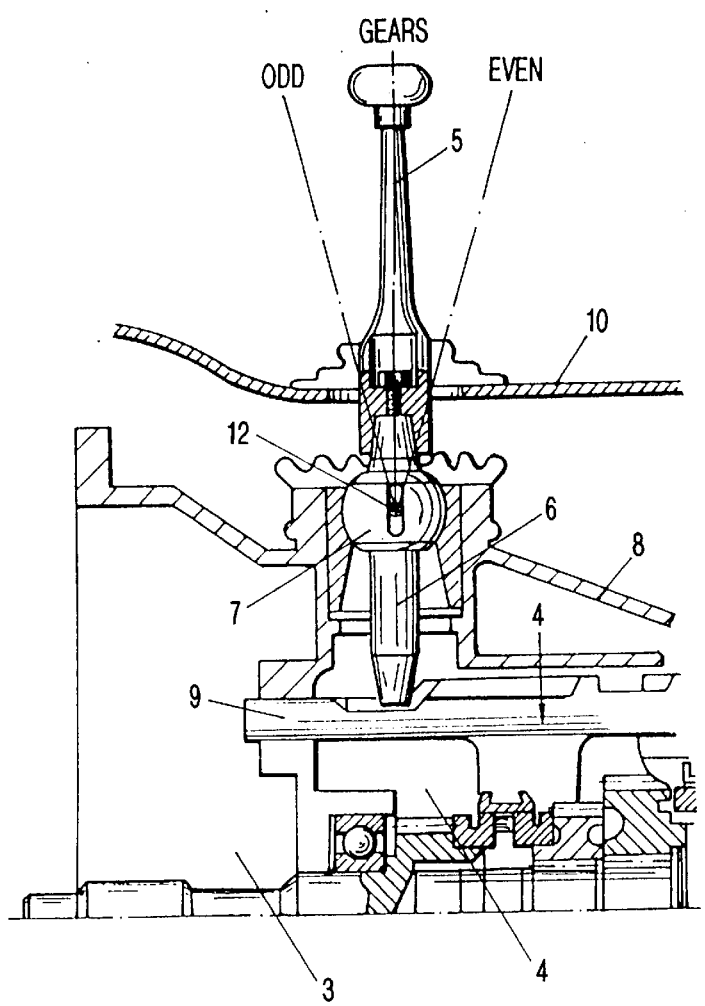
FIG-3b

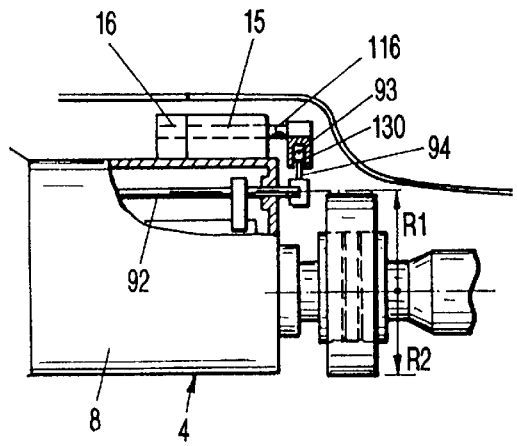
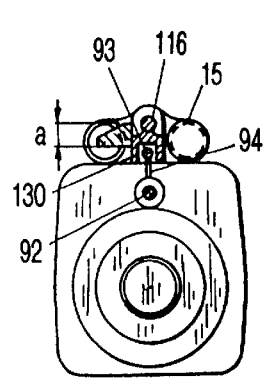
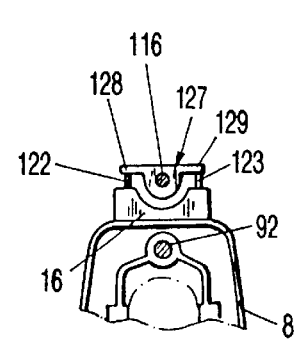
FIG-31    FIG-32    FIG-33
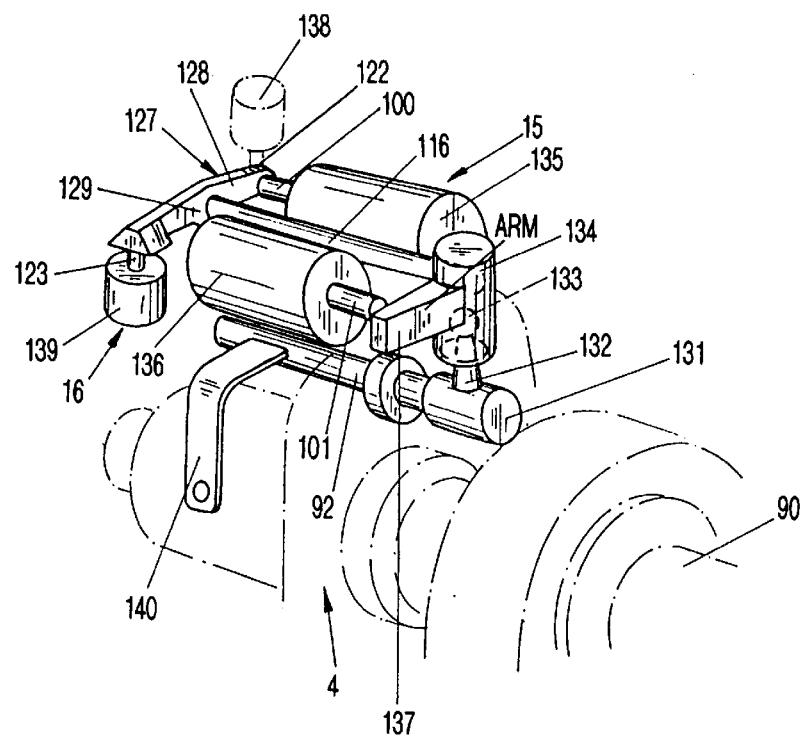
FIG-34

ACTUATING DEVICE FOR AUTOMATICALLY OPERATING MANUAL TRANSMISSIONS OF VEHICLES

BACKGROUND OF THE INVENTION

The invention relates to an actuating device for automatically operating manual transmissions of vehicles, comprising at least two gear and shift actuators positioned at an angle to one another with which a selector shaft of the manual transmission can be rotated and displaced for selecting a respective gate and gear of the transmission.

In manual transmissions it is known to select with the gear shift lever, extending upwardly into the passenger compartment, the respective gears for driving the vehicle. In order to automatically operate such a manual transmission, actuating devices are known which comprise gear and shift actuators that are positioned at an angle to one another. With them, the selector shaft of the transmission can be rotated and displaced accordingly.

It is an object of the present invention to embody the actuating device of the aforementioned kind such that it is more compact, less expensive, and allows for a simple gear shifting action.

SUMMARY OF THE INVENTION

The actuating device for automatically operating a manual transmission of a vehicle according to the present invention is primarily characterized in that the actuating device comprises at least two actuators for moving by rotation and translatory movement a selector shaft of a manual transmission in order to select a gate and a gear of the manual transmission. Each one of the actuators comprises a first piston that upon displacement moves by rotation and/or translatory movement the selector shaft.

Advantageously, the actuating device further comprises a transmission lever connected to the actuator and to the selector shaft.

Advantageously, the transmission lever is a two-arm lever acting with a first arm on the selector shaft and connected with a second arm to the first pistons of the actuators.

The transmission lever is preferably spherically supported.

Advantageously, the first pistons are pivotably connected to the second arm.

The first pistons have a ball at one end thereof and the second arm comprises a coupling member having a ball receiving unit for each one of the balls, wherein the balls engage the ball receiving units.

Preferably, the actuators are spherically supported.

Advantageously, the second arm comprises a spherical end and a first one of the actuators comprises a coupling member fixedly connected to the first piston of the first actuator, the coupling member comprising a receiving unit. The spherical end is preferably supported in the receiving unit.

Expediently, the coupling member has a ball head and a second one of the actuators comprises a guide fixedly connected to the first piston of the second actuator, the ball head engaging the guide.

The guide is preferably a U-shaped member having legs extending perpendicular to the axis of the first piston of the actuator.

The second arm advantageously comprises a spherical end and a first one of the actuators comprises a slide connected to the first piston of the first actuator. The slide comprises a receiving unit, the spherical end being supported in the receiving unit.

A second one of the actuators engages the slide for displacing the slide perpendicularly to the axis of the first piston of the first actuator.

Advantageously, the actuating device further comprises a support connected to the first piston of the second actuator so as to be displacable by the second actuator, the slide being received in the support.

Four of the actuators are preferably connected to the second arm and the actuators are positioned at right angles to one another.

Advantageously, the second arm has a spherical end and the first pistons of the actuators engage the spherical end.

The actuating device may also further comprise at least one auxiliary piston for receiving one of the first pistons. The first piston is preferably displaceable in the auxiliary piston.

The actuators have a pressure chamber and a bushing displaceably mounted in the pressure chamber. The first pistons are received in the bushings.

Expediently, the first pistons are displaceable in the bushings.

A first one of the actuators may comprise a second piston extending parallel to the first piston and may further comprise abutments for cooperating with the first and second pistons in an axial direction of the first and second pistons.

The first actuator expediently comprises a common housing for the first and second pistons.

Advantageously, the actuating device further comprises a support rod to which the abutments for the first and second pistons are connected.

The abutments are preferably fixedly connected to the support rod.

The support rod is displaceable by moving the first or the second piston outwardly relative to the common housing.

The support rod is preferably connected to the selector shaft.

The abutments are axially fixedly connected to the selector shaft.

The actuating device may further comprise an actuating lever with a first and a second arm for rotating the selector shaft. A second one of the actuators comprises a second piston extending parallel to the first piston. The first piston engages the first arm and the second piston engages the second arm.

An actuating device may further comprise a support rod to which the abutments for the first and second pistons are connected, wherein the actuating lever is rotationally fixedly connected to the support rod.

In a preferred embodiment, one of the abutments is the actuating lever.

The actuating lever is preferably rotationally fixedly connected to the selector shaft.

The actuating device may further comprise a coupling member arranged on the selector shaft and extending transversely to the selector shaft. The coupling member has a ball head and the actuating lever has a ball receiving unit. The ball head engages the ball receiving unit.

The actuating device may also comprise a bridge element for connecting the actuating device to the selector shaft.

The bridge element preferably bridges a compensation element.

Advantageously, the second arm of the gear lever has a first and a second abutment spaced from one another in the pivoting direction of the gear lever. One of the actuators has a second piston. The first piston engages the first abutment and the second piston engages the second abutment.

The second arm may have a third abutment with opposed sides. A second one of the actuators has a second piston and the first and second pistons of the second actuator are positioned at a right angle to the first and second pistons of the first actuator and act on the opposed sides of the third abutment.

The actuating device may comprise a coupling member positioned on the selector shaft and comprising three arms projecting therefrom. The three arms are circumferentially spaced about the coupling member at an angle of 90° relative to one another.

A first one of the actuators has a second piston and two opposed ones of the three arms are acted upon by the first and second pistons of the first actuator for displacing the selector shaft.

A second one of the actuators has a second piston and the first and second pistons of the second actuator act on opposing sides of a third one of the three arms for rotating the selector shaft.

Preferably, the actuating device further comprises a piston rod coaxially positioned to the selector shaft for displacing the selector shaft. The piston rod has connected thereto a piston housed within a cylinder housing connected to the vehicle.

The gear and shift actuators (for selecting a gear and a gate) of the inventive actuating device have reciprocating pistons which are preferably hydraulically actuated. The gear and shift actuators are arranged at an angle to one another so that the respective pistons are also positioned at an angle to one another. Thus, the selector shaft of the transmission can be rotated about its axis and displaced axially, depending on which one of the pistons is being actuated. The two actuators, depending on the available mounting space within the transmission area, can be mounted accordingly. It is thus possible to provide the inventive actuating device even in vehicles where only a minimal mounting space is available. This is, for example, the case in vehicles in which the transmission is provided within a transmission tunnel.

BRIEF DESCRIPTION OF THE DRAWINGS

The object and advantages of the present invention will appear more clearly from the following specification in conjunction with the accompanying drawings, in which:

FIG. 1 shows in a schematic representation a part of a vehicle with a drive unit positioned above the front axle of the vehicle and comprised of engine, clutch, and transmission, having a gear shift lever for switching gears;

FIGS. 2a and 2b show in a schematic representation the respective shifting paths of the gear shift lever for selecting a gate in a five (5 speed), respectively, six gear (6 speed) transmission;

FIG. 3a shows in cross-section the connection of the gear shift lever to the transmission;

FIG. 3b shows the connection of the gear shift lever to the transmission in a longitudinal section;

FIGS. 31 to 33 show in representations according to FIGS. 22 to 24 an inventive actuating device mounted on a transmission parallel to the selector shaft;

FIG. 34 shows in a perspective representation a further embodiment of the inventive actuating device;

DESCRIPTION OF PREFERRED EMBODIMENTS

Figure 4:
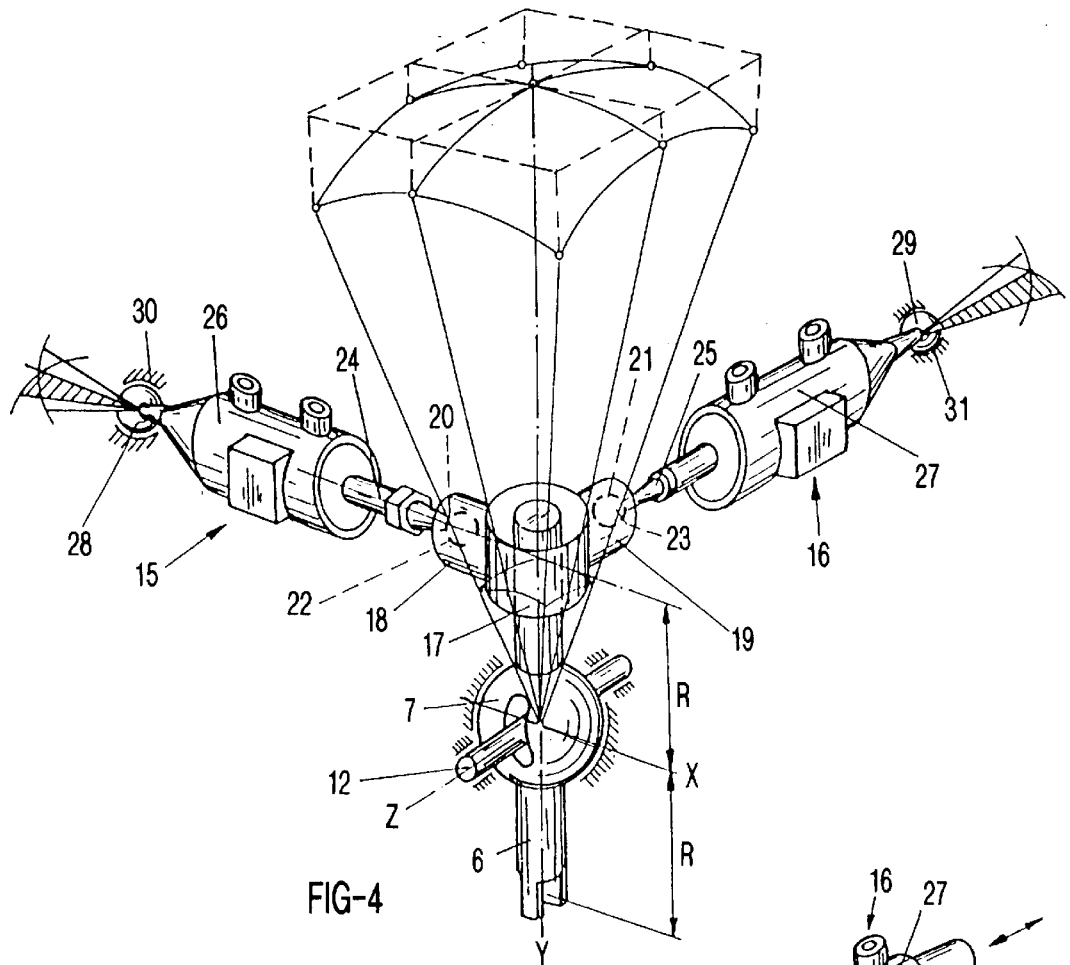
FIG. 4 shows a first embodiment of the inventive actuating device.

The present invention will now be described in detail with the aid of several specific embodiments utilizing FIGS. 1 through 50.

FIG. 1 shows a motor vehicle 1 with an engine 2 arranged at the front end. A transmission 4 is connected via clutch 3 to the engine 2. A manual gear shift lever 5 projects upwardly into the passenger compartment and is used for shifting gears. FIGS. 2a and 2b show the movement schematic of the gear shift lever 5. FIG. 2a shows the movement for a five speed transmission. The individual gears are indicated with numerals 1 through 5 and the reverse gear is indicated with the latter R. The different gears are positioned in three shifting paths (gates). The gear shift lever 5 for selecting the first and second gear is first pivoted from the neutral position in a manner known per se into the first shifting path (gate) and is then pivoted in the direction of travel to the front or to the rear within the gate in order to select the first or second gear. The gear shift lever 5 can be pivoted from the neutral position directly in the travel direction to the front or to the rear in order to select the third or fourth gear (in the second shifting path or gate). For selecting the fifth gear or the reverse gear the gear shift lever 5 is moved into the third shifting path or gate.

FIG. 2b shows the movements for a six gear (6 speed) transmission. In order to be able to select the six forward gears and the reverse gear R, it is necessary to provide four shifting paths (gates).

As shown in FIG. 3a and FIG. 3b, the gear shift lever 5 is mounted on a transmission lever 6 which is supported with a ball 7 in the transmission housing 8 in a manner known per se. The transmission lever 6 engages a gate change 9 of the transmission 4.

The gear shift lever 5 which projects upwardly through the floor board (bottom plate) 10 of the vehicle 1 is pivoted from the neutral position represented in FIGS. 3a, 3b into the desired shifting path (gate) transverse to the travel direction of the motor vehicle 1. As soon as the desired shifting path or gate has been reached, the gear shift lever 5 is moved in the travel direction to the front or to the rear in order to select the desired gear (speed). Upon pivoting the gear shift lever 5 about the ball 7, the transmission lever 6 which is also connected to the ball 7, is also pivoted in the corresponding direction. It entrains the gate change 9 in a manner known per se.

The gear shift lever 5 is connected without additional connecting means via the spherically supported transmission lever 6 to the transmission mechanism. The ball 7 is penetrated by a diametric opening 11 transverse to the axis of the gate change 9. A bearing axle 12 extends through the opening 11 and its ends are mounted at the housing. The diametric opening 11 is embodied such that the gear shift lever 5, respectively, the transmission lever 6 can be moved in the travel direction to the front and to the rear as well as transverse to the travel direction of the motor vehicle 1.

As shown in FIG. 3a, two spring-loaded bolts 13 and 14 engage at diametrically opposed locations the transmission lever 6 and maintain the transmission lever 6 and thus also the gear shift lever 5 in its neutral position. When the gear shift lever 5 is pivoted, the bolt 13 or 14, depending on the pivoting direction, is displaced counter to the spring force. The spring force, on the other hand, returns the gear shift lever 5 into its neutral position when released by the operator/driver.

The actuating devices disclosed in the following together with the corresponding electronic control automatically operate the manual transmission (explained above in conjunction with FIGS. 1 through 3). The movements of the gear shift lever 5 are carried out by the corresponding gear and shift actuators of the actuating device.

FIG. 4 shows such an actuating device with two actuators 15 and 16. Instead of the gear shift lever 5 (FIGS. 1 through 3) a ring 17 is rotationally fixedly mounted on the transmission lever 6. The transmission lever 6 is, as has been explained in connection with FIGS. 1 through 3, spherically supported at the ball 7 that is penetrated by the bearing axle 12.

Two projections 18 and 19 extending at a right angle to one another project from the ring 17, whereby the projection 19 extends parallel to the bearing axle 12 while the other projection 18 extends at a right angle thereto. The two projections 18, 19 have at their free ends ball receiving units 20 and 21 in which balls 22 and 23 are spherically supported. These balls 22, 23 are connected to the free ends of the pistons 24, 25 which project from the cylinder housings 26, 27 of the actuators 15, 16. The ends of the cylinder housings 26, 27 facing away from the pistons 24, 25 are supported spherically at the vehicle. For this purpose, the cylinder housing 26, 27 is provided with corresponding balls 28, 29 which engage correspondingly spherically shaped received units 30, 31 at the vehicle. By loading the piston surface of the pistons 24, 25, the transmission lever 6 is pivoted into the desired direction. Since the cylinder housings 26, 27 are spherically supported, the actuators 15, 16 have the required degrees of freedom in order to be able to assume any constructively resulting pivoting position. The corresponding connectors for supplying and removing the pressure medium, preferably a hydraulic medium, are schematically represented at the cylinder housings 26, 27. With the actuators 15, 16, the desired gears of the vehicle can be automatically selected. In FIG. 4 a movement schematic is represented that corresponds to the movement schematic of FIG. 2a. With the actuators 15, 16 the three gates (shifting paths) can be selected and the desired gears can be shifted.

The two actuators 15, 16 are of the same construction so that a simple design results. The movements of the no longer present gear shift lever 5 can be performed instead with the actuators so that the transmission 4 can be actuated via the transmission lever 6 in the desired manner. Since the pistons 24, 25 are spherically received within the projections 18, 19 of the ring 17, the pistons, upon pivoting of the transmission lever 6 in the form of a two-arm lever, can perform the required relative movement between the ring 17 and the actuators 15, 16 in a simple manner because the pistons can transmit pushing forces as well as pulling forces.

Figure 5:
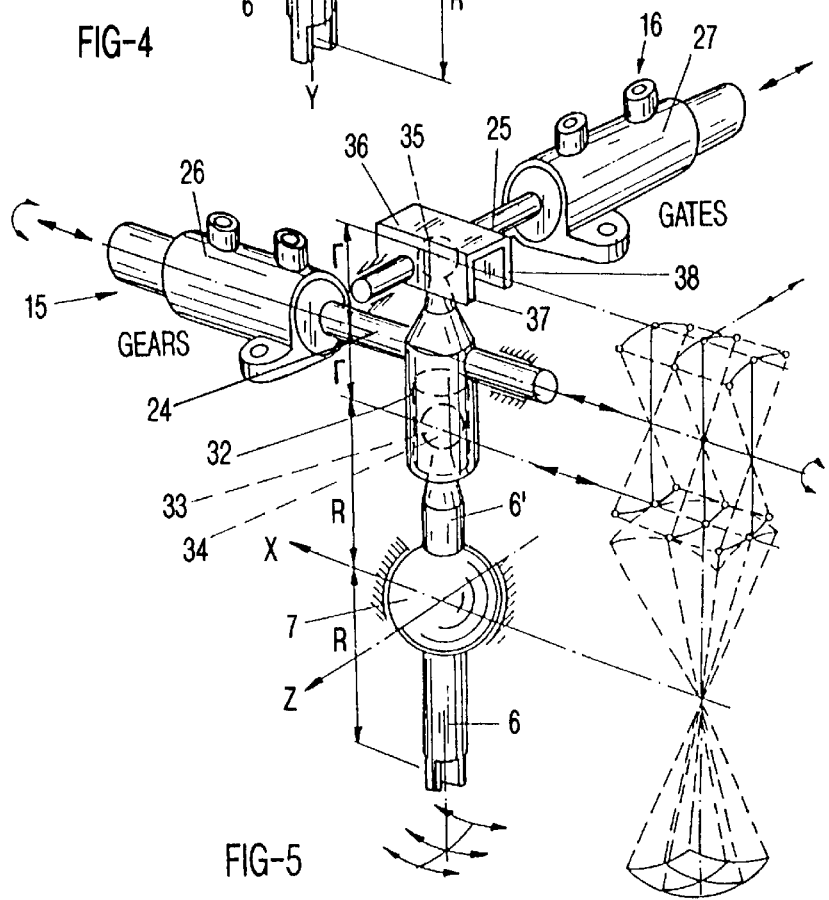
FIGS. 5 to 7 show in representations according to FIG. 4 further embodiments of the inventive actuating device.

FIG. 5 shows an actuating device in which the actuators 15, 16 are also positioned at a right angle to one another. Onto one arm 6' of the transmission lever 6 a coupling member 32 is placed. It has a cylindrical receiving bore 33 that is engaged by the spherical end 34 of the correspondingly designed transmission lever arm 6'.

The coupling member 32 is radially penetrated by the piston 24 of the actuator 15. The end of the coupling member 32 facing away from the transmission lever 6 has a bearing ball head 35 which is received in the U-shaped member 36. It is supported on the piston 25 of the actuator 16. The bearing ball head 35 of the coupling member 32 rests at the inner sides of the two legs 37, 38 of the U-shaped member 36.

The legs 37, 38 of the U-shaped member 36 are positioned between two coaxial portions of the piston 25 which project from the cylinder housing 27. The piston 24 of the actuator 15 projects from the cylinder housing 26.

In contrast to the embodiment according to FIG. 4, the two cylinder housings 26, 27 are fixedly connected to the vehicle, respectively, to the transmission. The actuator 15 serves in the embodiment according to FIG. 4 for selecting the gears (gear actuator), while the actuator 16 positioned at a right angle thereto, corresponding to the previous embodiment, is used for selecting the gate (shift actuator). Upon displacing the piston 25 of the actuator 16, the respective gate or shifting path is selected. The transmission lever 6 is pivoted in the Z-direction. Due to the spherical-pivotable support of the coupling member 32 within the profiled member 36, the required movability of the U-shaped member 36 relative to the coupling member 32 is ensured during this pivot movement. Upon displacement of the piston 25, the transmission lever 6 is entrained by the profiled member 36 which is axially fixedly connected to the piston so that the transmission lever 6 pivots in the desired direction about the ball 7. As soon as the desired gate or shifting path has been selected, the piston 24 of the actuator 15 is displaced in the desired direction so that the transmission lever 6 is pivoted within the selected gate or shifting path in order to shift into the desired gear. Upon displacement of the piston 24, the coupling member 32 with its bearing ball head 35 moves along the profiled member 36. Thus, the piston 25 is only movable in the axial direction and is secured against rotation. The piston 24 of the actuator 15 is not only displaceable in the axial direction but also rotatable about its axis. This rotatability of the piston 24 is required because, during displacement of the piston 25 of the actuator 16, the coupling member 32 is moved in the Z-direction i.e., transverse to the axis of the piston 24.

As in the previous embodiment, the actuators 15 and 16 thus serve to first select the desired gate and to subsequently select the desired gear. The actuators 15, 16 are advantageously hydraulically actuated in order to displace the pistons 24, 25 in the desired direction.

Figure 6:
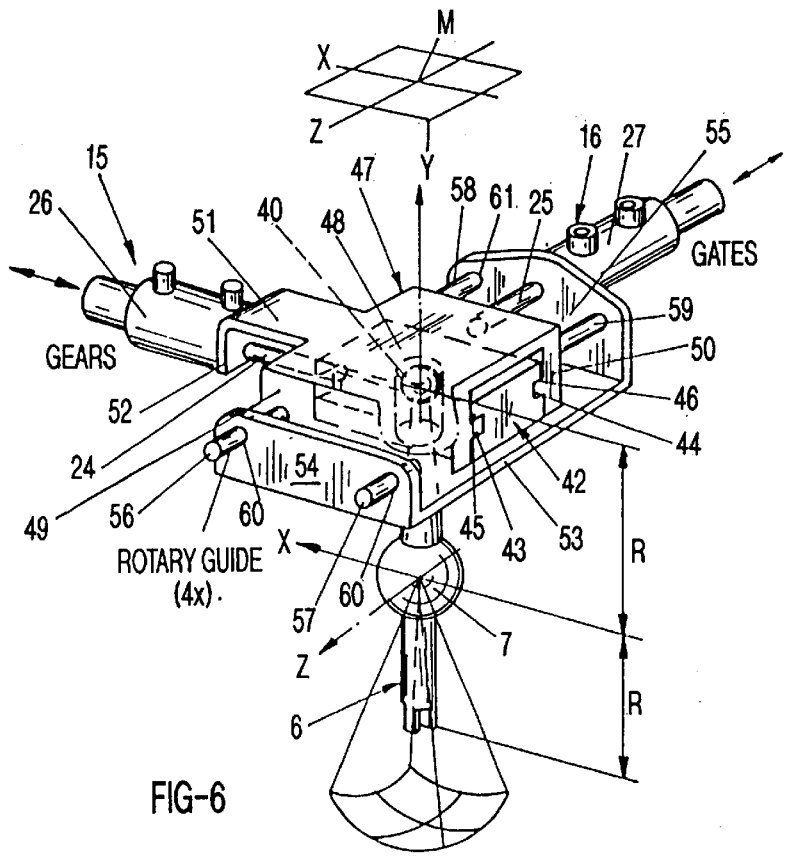

FIG. 6 shows an actuating device comprising two actuators 15 and 16 positioned at a right angle to one another. With the actuator 15 the gears are selected (gear actuator), while with the actuators 16 the gates of the transmission are selected (shift actuator). The arm 6' of the transmission lever 6 is formed by a coupling member 39 that is fixedly connected to the ball 7. The coupling member 39 is conically shaped and has a spherical end 40 which engages a cylindrical receiving bore 41 of the slide 42. It is of a parallel-epipedal design and is displacably supported in the X-direction, i.e., in the axial direction, of the piston 24 of the actuator 15.

The slide 42 is provided with guides 43, 44 at its side surfaces extending in the X-direction. The guides 43, 44 are depressions which are engaged by guide members 45, 46 of a support 47. The support 47 is substantially U-shaped and has a stay 48 which connects the two parallel extending legs 49, 50. At the facing inner sides of the legs 49, 50 the guide members 45, 46 are provided which are advantageously unitary parts of the legs. The legs 49, 50 extend also in the X-direction and, in the mounted position of the actuating device, project downwardly. The stay 48 has a central extension at the side facing the actuator 15. The extension 51 comprises a downwardly bent edge 52 to which is connected the cylinder housing 26 of the actuator 15. The piston 24 of the actuator 15 penetrates the edge 52 and is fixedly connected to the slide 42. Upon reciprocating action of the piston 24, the slide 42 is thus displaced in the X-direction relative to the support 47. Since the coupling member 39 is connected via the spherical end 40 in the receiving unit 41 of the slide 42, the transmission lever 6 is thus pivoted about the ball 7 upon displacement of the slide 42.

The slide 42 is positioned on a base plate 53 which extends perpendicular to the axial direction of the piston 24 and parallel to the stay 48 of the support 47. The base plate 53 has at both ends parallel extending legs 54, 55 having a longitudinal extension in the X-direction.

At the outer sides of the legs 49, 50 of the support 47 facing away from one another, two parallel rods 56, 57 and 58, 59, respectively, extending in the Z-direction are provided which are spaced from one another. They serve as a rotary guiding means and are supported in corresponding openings 60, 61 in the legs 54, 55 of the base plate 53.

At the leg 55 of the base plate 53 the cylinder housing 27 of the actuator 16 is fastened. Its piston 25 projects through the leg 55 and is connected to the leg 50 of the support 47.

In order to select the respective gate, the shift actuator 16 is activated and its piston rod 25 is displaced in the desired Z-direction. The slide 42 is entrained by the support 47 so that the transmission lever 6 is correspondingly pivoted.

The receiving unit (bore) 41 within the slide 42 is designed such that the coupling member 39 with its spherical end 40 is also moved in the Y-direction within the receiving unit (bore) upon pivoting of the transmission lever 6. As soon as the desired gate has been selected, the piston 24 is moved by the actuator 15 accordingly so that the slide 42 is displaced in the X-direction relative to the support 47. Thus, the transmission lever 6 is pivoted within the selected gate in order to be shifted into the desired gear.

In the movement diagram of the slide 42 represented in FIG. 6, the central axis M' of the central ball receiving unit (bore) 41 thus is linearly moved within the X-Z plane. Below the transmission lever 6, the movement diagram of the transmission lever 6 is represented.

During the working stroke of the actuator 16, the actuator 15 is translatorily displaced in the Z-direction. In the preceding embodiments (FIGS. 4 and 5), the non-selected actuator 15 or 16 (i.e., the one not presently used) must be short-circuited so that the aforementioned compensation movements during pivoting and linear displacement can be performed in the disclosed embodiments. In the embodiment according to FIG. 6, the slide 42 is displaced only linearly within the X-Z plane for generating the different pivoting movements of the transmission lever 6. Thus, in this embodiment a short circuiting of the non-selected actuator is not required.

Figure 7:
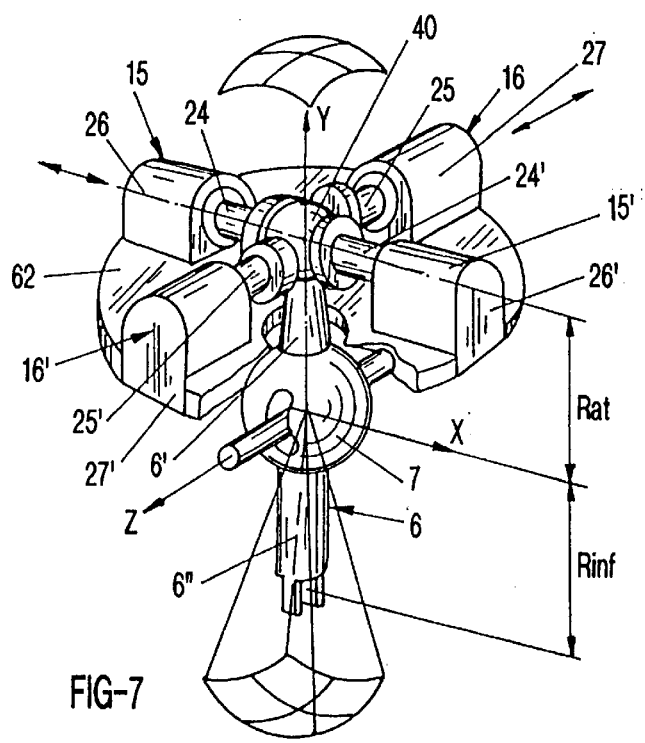

FIG. 7 shows a very compact design of the inventive actuating device which can also be manufactured very inexpensively. It comprises a total of four actuators 15, 16, 15', 16' which are respectively arranged opposite one another. The actuators 15, 15', 16, 16' are of identical construction and have pistons (plungers) 24, 25, 24', 25' which project from the cylinder housings 26, 27, 26', 27'. All pistons 24, 24', 25, 25' rest at the spherical end 40 which is provided at the free end of the arm 6' of the two-arm transmission lever 6. The pistons extend at a right angle to one another. In this manner, by actuating the respective actuator the transmission lever 6 can be pivoted in the desired amount about the ball 7 for the desired gate and gear selection. The two arms 6', 6" of the transmission lever 6 are advantageously of the same length. They have the length R. Of course, the two arms of the transmission lever 6 can also be of a different length, depending on the available mounting space and force ratios. The opposed pistons 24, 24' and 25, 25' are advantageously aligned with one another. The pistons 24, 24' extend in the X-direction, while the pistons 25, 25' extend in the Z-direction.

The actuators may have different construction. With the aid of FIGS. 8 through 12 advantageous embodiments of such actuators will be explained in more detail. All actuators can be mounted on a common base plate 62.

Figure 8:
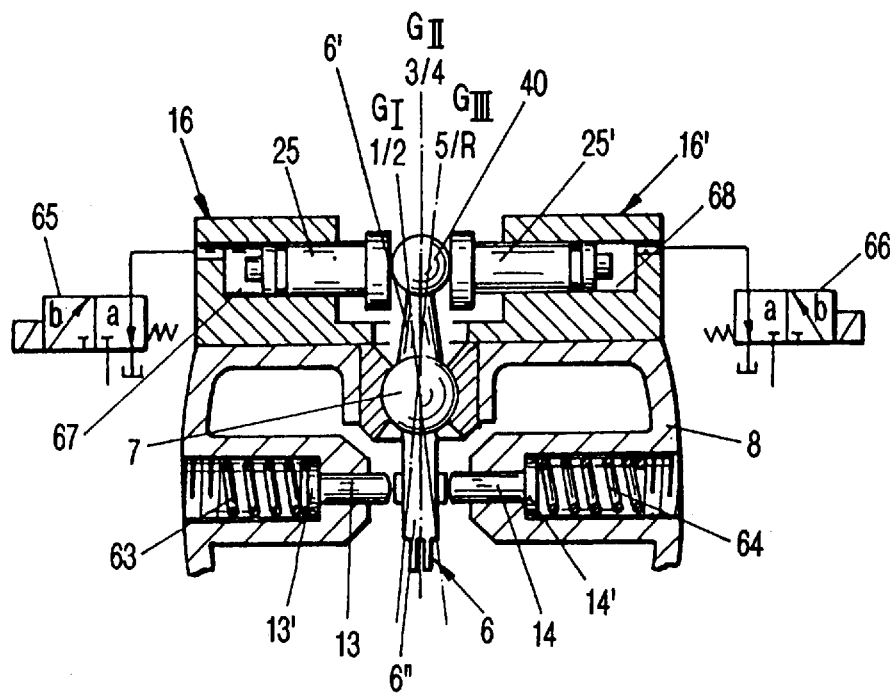
FIG. 8 shows a cross-section of the actuating device of FIG. 7.

FIG. 8 shows two oppositely arranged actuators 16, 16' with a common housing with which the gate selection is performed. The two shift actuators 16, 16' are mounted on the transmission housing 8 in which the transmission lever 6 is spherically supported in the disclosed manner by the ball 7. At the arm 6" facing the transmission two diametrically opposed bolts 13 and 14 are provided which are loaded by the force of pressure springs 63, 64. The bolts 13 and 14 maintain the transmission lever 6 in its neutral position in which the bolts 13, 14 rest with their collars 13', 14' at abutments provided at the transmission housing.

The spherical end 40 of the other arms 6' of the transmission lever 6 have positioned thereat the two pistons 25, 25' of the actuators 16, 16.

The free ends of the pistons are advantageously widened.

The supply of hydraulic medium into the actuator 16, 16' is controlled by valves 65 and 66. In the neutral position of the transmission lever 6, represented in FIG. 8, the solenoid valves 65, 66 are switched such that the pressure chambers 67, 68 of the actuators 16, 16' are connected to the tank of the hydraulic medium. When the transmission lever 6 in the representation according to FIG. 8 is to be pivoted counterclockwise direction, the solenoid valve 66 is switched so that the hydraulic medium flows under pressure into the pressure chamber 68 and thus pushes the piston 25' out of the housing. The solenoid valve 65 is not switched so that upon pivoting of the transmission lever 6 by the moving piston 25' the oppositely positioned piston 25 is returned into its abutment position. In this manner, the transmission lever 6 can be easily pivoted into the gate $G_I$.

It is also possible, when starting from the neutral position (gate $G_{II}$) to switch the solenoid valve 65 such that the hydraulic medium flows under pressure into the pressure chamber 67. Then, the piston 25 is moved out of its housing and the transmission lever 6 is pivoted clockwise. Since the solenoid valve 66 is switched off, the piston 25' is thus returned by the spherical end 40 of the transmission lever 6 into abutment. Thus, the transmission lever 6 can be pivoted into the gate $G_{III}$.

In order to return the transmission lever 6 into the neutral position, the two solenoid valves 65, 66 are switched into the solenoid-loaded switching position b in which the two pressure chambers 67, 68 are loaded with system pressure. The bolt 13 or 14 prestressed by the respective spring 63 or 64, pivots the transmission lever 6 into the shown neutral position. Both pistons 25, 25' move thus synchronously.

Figure 9:
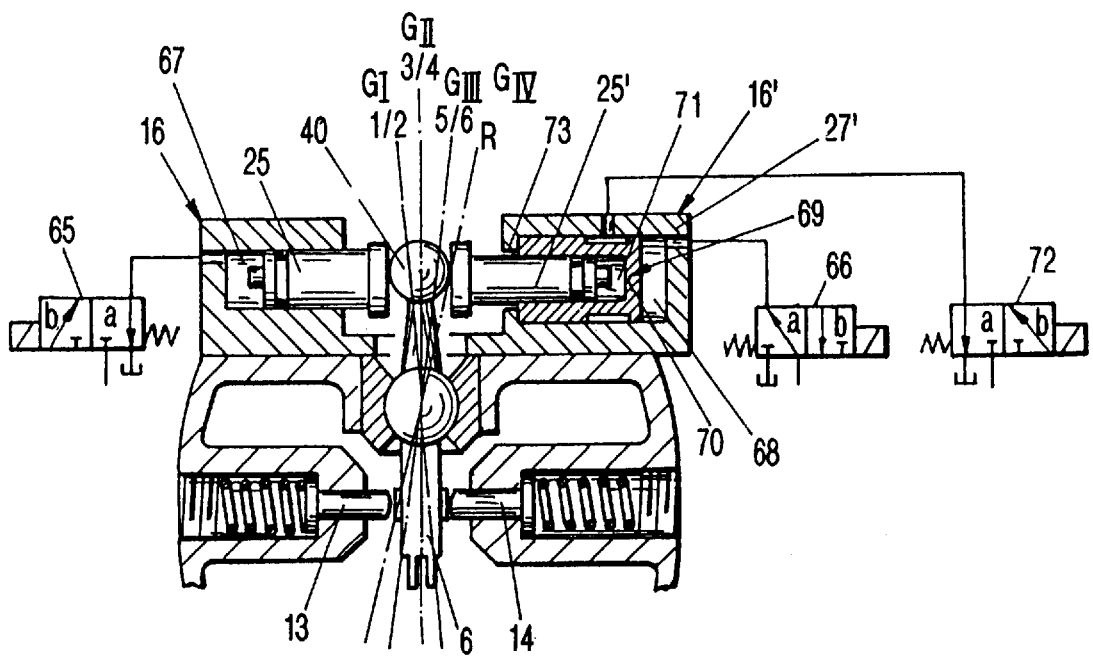
FIG. 9 shows in a representation corresponding to FIG. 8 a cross-section of the actuating device of FIG. 7 provided for a six gear (6 speed) transmission.

In the embodiment according to FIG. 9 the piston 25' of the actuator 16' is supported in an auxiliary piston 69 which can be displaced within the cylinder housing 27' of the actuator 16'. Between the bottom 70 of the auxiliary piston 69 and the piston 25' a pressure chamber 71 is formed into which the connector associated with the solenoid valve 72 opens. The solenoid valve 66 is connected to the pressure chamber 68 delimited between the bottom 70 of the auxiliary piston 69 and the bottom of the cylinder housing 27'.

The transmission lever 6 in the represented neutral position is centered by the bolts 13, 14. The two valves 65 and 72 are switched such that the pressure chambers 67 and 71 are connected to the tank. The solenoid valve 66 is switched such that pressurized hydraulic medium can flow into the pressure chambers 68. Thus, the auxiliary piston 69 is moved into its left end position shown in FIG. 9 in which it rests at the abutment 73. The surface loaded by the hydraulic medium within the pressure chamber 68 of the piston 69 is greater than the surface of the piston 25, 25' pressurized by the hydraulic medium within the pressure chambers 67 and 71. Thus, the auxiliary piston 69 upon pressure loading by the hydraulic medium within the pressure chamber 69 is maintained in its abutment position represented in the drawing. In this manner, the reverse gear R is locked against accidental selection in a manner to be described in the following. When it is desired to pivot the transmission lever 6 counter-clockwise from the neutral position of FIG. 9 into the gate $G_I$, the solenoid valve 72 is switched such that the hydraulic medium flows under pressure into the pressure chamber 71. The two other solenoid valves 65 and 67 remain in the shown switching position. Thus, the piston 25' is moved out of the housing and the transmission lever 6 is pivoted. The piston 25 is accordingly returned by the spherical end 40 of the transmission lever 6. Due to the aforementioned surface ratios, the auxiliary piston 69 maintains its represented abutment position.

When it is desired to pivot the transmission lever 6 in a clockwise direction, the solenoid valve 72 is switched into the position a while the solenoid valve 65 is switched into the position b so that the pressurized hydraulic medium flows into the pressure chamber 67 of the actuator 16. Thus, the piston 25 is displaced and the spherical end 40 of the transmission lever 6 is pivoted. Since the pressure chamber 71, due to the solenoid valve 72 being in the position a, is connected to the tank, the piston 25' is returned into its abutment position at the bottom 70 of the auxiliary piston 69.

In the represented embodiment the transmission has four gates so that the transmission lever 6 can also be pivoted into the gate $G_{IV}$ in which the reverse gear R is located. When the transmission lever 6 is pivoted into the gate $G_{III}$, as disclosed above, the piston 25' rests in its end position at the bottom 70 of the auxiliary piston 69. The auxiliary piston 69 itself is pressurized by the hydraulic medium within the pressure chamber 68 so that it cannot be displaced. In order to be able to shift into the reverse gear R, the solenoid valve 66 must now be switched into the position b so that the pressure chamber 68 is connected to the tank. The solenoid valve 65 is furthermore switched such (position b) that the hydraulic medium can flow under pressure into the pressure chamber 67. The solenoid valve 72 remains switched in position a so that the pressure chamber 71 is also connected to the tank. This ensures that now the auxiliary piston 69 can be displaced by the piston 25' until the bottom 70 of the auxiliary piston 69 abuts the bottom of the cylinder housing 27'. The gate $G_{IV}$ is now selected.

When it is desired to return the transmission lever 6 from the gate $G_{IV}$ into the gate $G_{III}$, the solenoid valve 66 is switched into the position, a while the solenoid valve 65 is maintained in the position b and the solenoid valve 72 is maintained in the position a. The auxiliary piston 69, together with the piston 25' resting at its bottom 70, is thus displaced until the auxiliary piston 69 abuts the abutment 73 at the housing. Via the spherical end 40 of the transmission lever 6 the piston 25 is thus returned.

When the transmission lever 6 is to be pivoted from the gate $G_{IV}$ directly into the gate $G_I$, the solenoid valve 65 is switched into position a so that the pressure chamber 67 is connected to the tank. The solenoid valve 66 is switched in position a so that the pressure chamber 68 is loaded by the system pressure. Furthermore, the solenoid valve 72 is switched into position b so that the pressure chamber 71 can be supplied with the hydraulic medium. In this manner, the auxiliary piston 69 and the piston 25' are displaced to the left in FIG. 9 until the piston 25 is returned by the spherical end 40 into its abutment position at the bottom of the pressure chamber 67. The movement of the auxiliary piston 69 is terminated when it abuts the abutment 73. Then, the piston 25' is displaced relative to the auxiliary piston 69 until the piston 25 of the actuator 16 reaches the aforedescribed abutment position.

In order to pivot the transmission lever 6 from the gate $G_I$ into the gate $G_{II}$, the solenoid valve 72 is switched into position b. The solenoid valve 65 is also switched into position b. Thus, the two pressure chambers 67 and 71 are supplied with hydraulic medium. Since the surfaces of the two pistons 25, 25' loaded by hydraulic medium are identical in size, the transmission lever 6 is returned into the neutral position (gate $G_{II}$) by the prestressed bolt 14. Thus, the two pistons 25, 25' move as a unit because they are loaded by the same pressure. As soon as the piston 14 has reached the abutment position represented in FIG. 9, the transmission lever 6 has been returned into the neutral position. During this return pivoting movement of the transmission lever 6, the solenoid valve 66 is switched in position a so that the auxiliary piston 69 remains in the shown abutment position.

When the transmission lever 6 is positioned in the gate $G_{III}$, the displacement into the gate $G_{II}$, is carried out correspondingly in a reverse manner by switching the two pistons 25, 25' so as to be pressure loaded. In this case, the transmission lever 6 is returned by the prestressed bolt 13 into the neutral position (gate $G_{II}$) whereby the two pistons 25, 25' are displaced as a unit. The neutral position is reached when the bolt 13 has reached the abutment position shown in FIG. 9. During this displacement, the auxiliary piston 69 remains in its abutment position since the solenoid valve 66 is switched into position a.

When the transmission has only three gates, an auxiliary piston is not required, as shown in FIG. 8. In this case, the two pistons 25, 25' are sufficient for displacing the transmission lever 6 into the different gates $G_I$ to $G_{III}$.

Figure 10:
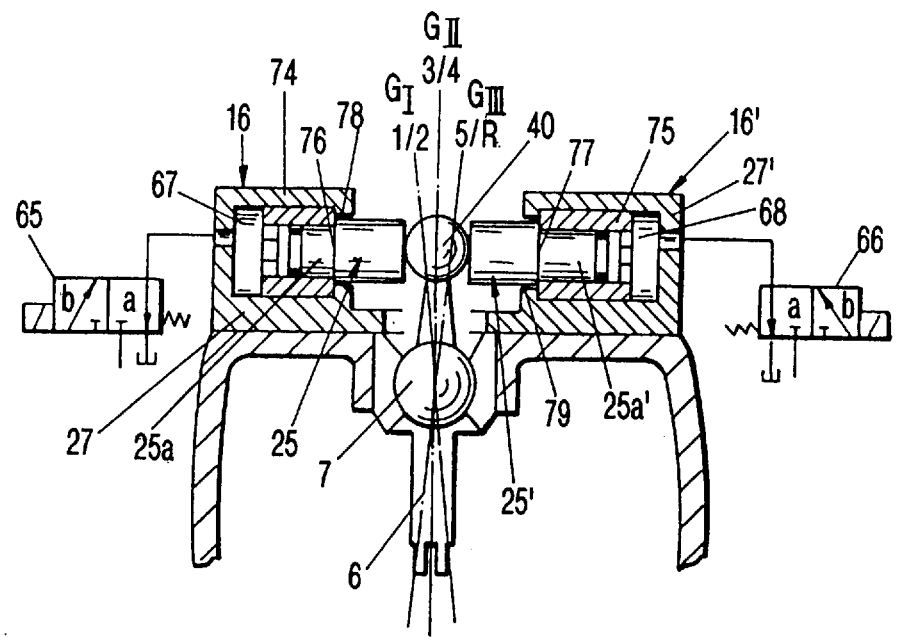
FIG. 10 shows in a representation corresponding to FIG. 8 a cross-section of a further embodiment of the inventive actuating device.
Figure 10A:
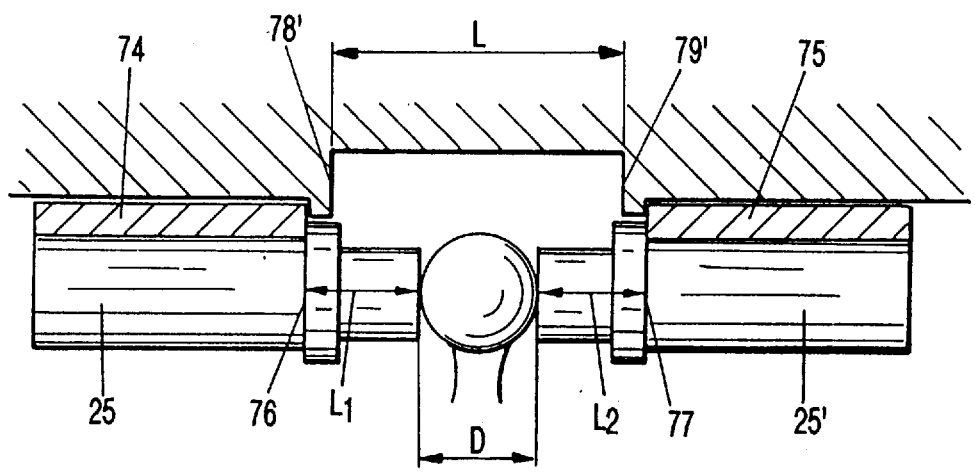
FIG. 10a shows the dimensional proportions of the actuating device of FIG. 10.

FIG. 10 shows a further simplified embodiment of actuators 16, 16', For centering the transmission lever 6 in the neutral position, no additional centering bolts 13, 14 with corresponding pressure springs 63, 64 are needed. Instead, the transmission lever 6 is hydraulically-mechanically centered within the gate $G_{II}$. At the spherical end 40 of the transmission lever 6 the two pistons 25, 25' of the actuators 16, 16' rest. The pressure chambers 67, 68 are connected to the solenoid valves 65, 66 which are switching valves as in the previously described embodiments. The two pistons 25, 25' are supported in bushings 74, 75 which are displaceable in the cylinder housings 27, 27' of the actuators 16, 16', The pistons 25, 25' project with a piston section 25a, 25a' of a reduced diameter into the bushings 74, 75. At the transition from the piston section 25a, 25a' into the piston section of greater diameter, a radial ring shoulder 76, 77 is formed with which the pistons rest at the end face of the bushings 74, 75. The free end of the piston sections 25, 25a' is positioned in a common plane with the respective end faces of the bushings 74, 75. In the neutral position represented in FIG. 10 of the transmission lever 6, the bushings 74, 75 rest at a housing abutment 78, 79 of the cylinder housings 27, 27' of the actuators 16, 16', The pistons 25, 25' project from the respective cylinder housing 27, 27' and rest at the spherical end 40 of the transmission lever 6. When the transmission lever 6 is pivoted from the shown neutral position into the gate $G_I$, the solenoid valve 66 is switched into position b so that the hydraulic medium flows under pressure into the pressure chamber 68. It loads not only the bushing 75 at its annular end face but also the piston section 25a' having a smaller diameter. The solenoid valve 65 remains in position a in which the pressure chamber 67 is connected to the tank. The piston 25' is displaced relative to the bushing 75 resting at the housing abutment 79 so that the transmission lever 6 is pivoted counter-clockwise about the ball 7. The piston 25 is returned to the abutment position at the bottom of the pressure chamber 67 and entrains via its annular shoulder 76 the bushing 74.

When it is desired to pivot the transmission lever 6 from the neutral position in the opposite direction into the gate $G_{II}$, the solenoid valve 66 is switched into position a and the solenoid valve 65 is switched into position b so that the hydraulic medium flows under pressure into the pressure chamber 67. When for this switching action of the solenoid valve 65 the transmission lever 6 is in the shown neutral position, the piston 25 is displaced while the bushing 74 rests under pressure load at the housing abutment 78. The piston 25' is thus returned into the abutment position at the bottom of the pressure chamber 68 whereby via the annular shoulder 77 the bushing 75 is also entrained.

The end faces of the two pistons 25, 25' loaded by the hydraulic medium have the same size. The annular surfaces of the two bushings 74, 75 which are loaded by the hydraulic medium are also of the same size. When the transmission lever 6 is to be returned from the gate $G_I$ into the neutral position, the solenoid valve 65 is switched into the position b while the solenoid valve 66 remains in position b. The bushing 75 rests at the abutment 79 at the housing. The hydraulic medium flowing into the pressure chamber 67 loads the entire surface of the bushing 74 and the piston 25, while in the actuator 16' only the hydraulic force acting on the surface of the piston 25' will act as a hydraulic counter force. Since this surface is smaller than the annular surface of the bushing 74 and the surface of the piston 25, the bushing 74 and the piston 25 are displaced to the right in FIG. 10 so that the transmission lever 6 is moved into the neutral position $G_{II}$ in the clockwise direction. The piston 25' is returned relative to the bushing 75 until its annular shoulder 77 comes into contact at the end face of the bushing 75. As soon as this abutment position has been reached, the surfaces of bushing and piston loaded respectively in the two pressure chambers 67 and 68 are of the same size so that the hydraulic centering of the transmission lever 6 in the neutral (center) position is ensured.

When it is desired to return the transmission lever 6 from the position $G_{III}$ into the neutral position, the solenoid valve 66 is switched into the position b, while the solenoid valve 65 remains in position b. The neutral position of the transmission lever 6 is now approached in a mirror-symmetrical fashion from the other side. As soon as the piston 25 with its ring shoulder 76 abuts the bushing 74, the position according to FIG. 10 has been reached again in which the two surfaces loaded by the hydraulic medium within the pressure chambers 67 and 68 are of the same size.

The disclosed hydraulic centering of the transmission lever 6 in the neutral position is optimally achieved when the following condition is fulfilled: $L=I_1+D+I_2$. The letter D indicates the diameter of the spherical end 40, the letter L indicates the distance between the two abutment surfaces 78', 79' for the bushings 74, 75, and $I_1$, respectively, $I_2$ refer to the distance of the end faces of the pistons 25, 25' from the corresponding ring shoulders 76, 77. When the aforementioned condition is fulfilled, in the neutral position of the transmission lever 6 the pistons 25, 25' rest with their end faces at the spherical end 40, while the annular shoulders 76, 77 of the pistons 25, 25' are positioned in a common plane with the abutment surfaces 78', 79' for the bushing 74, 75.

Due to manufacturing tolerances two cases must be differentiated. In one case, $L>I_1+D+I_2$ and in the other case $L<I_1+D+I_2$.

In the first case, the pistons 25, 25' rest under hydraulic pressure at the spherical end 40, while their ring shoulders 76, 77 are spaced at a small distance from the end faces of the bushings 74, 75 which rest under hydraulic pressure at the abutment surfaces 78', 79' at the housing. This spacing between the ring shoulders 76, 77 from the end faces of the bushing 74, 75, provides the aforementioned play by which the transmission lever 6 can deviate from the ideal neutral position under the effect of external forces.

In the other case the distance L between the abutment surfaces 78', 79' for the bushings 74, 75 is smaller than the sum of diameter D of the spherical end 40 and the distance $I_1$, $I_2$ of the piston end face from the corresponding annular shoulder 76, 77. Since the pistons 25, 25' rest under hydraulic pressure at the spherical end the bushings 74, 75 are loaded by hydraulic pressure in a direction toward one another, the bushings 74, 75 cannot be brought into abutment at the abutment surfaces 78', 79' because of these tolerances but instead remain in abutment at the annular shoulders 76, 77 of the pistons 25, 25'. Thus, the entire unit of bushings 74, 75, pistons 25, 25', and spherical end 40 can be displaced by the described tolerances until the respective bushings 74, 75 come into contact with the abutment surfaces 78', 79' at the housing. These tolerances result from the difference between the sum $I_1+D+I_2$, which in the disclosed three examples has been considered constant, and the actual size of the dimension L which in the disclosed scenario is smaller than the nominal value L.

Figure 11:
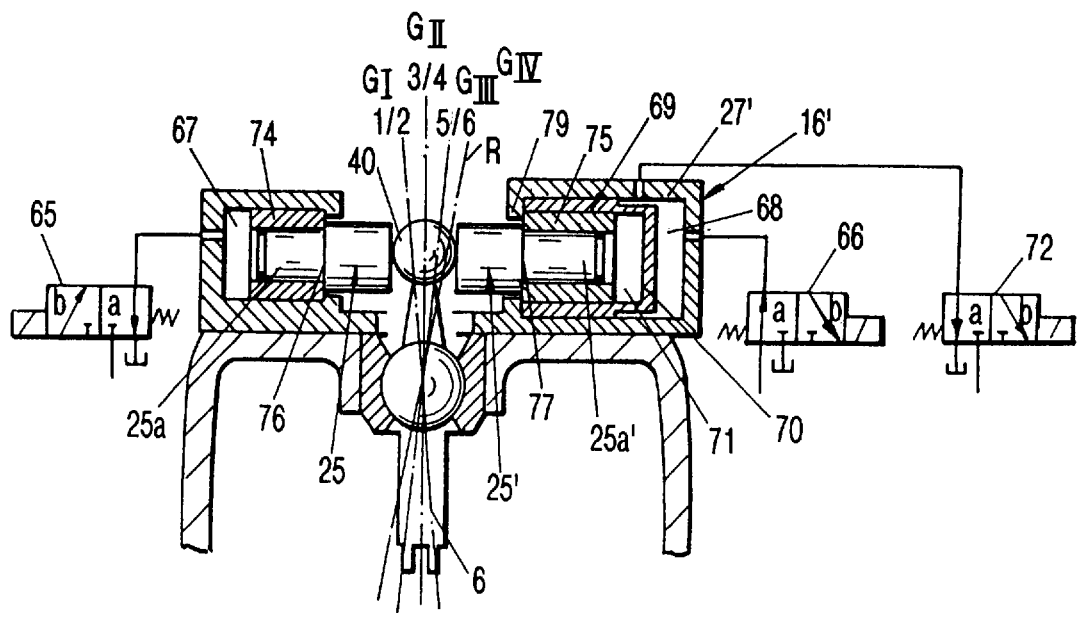
FIG. 11 shows in a representation corresponding to FIG. 10 a cross-section of the shift actuator of a further embodiment of the inventive actuating device.

FIG. 11 shows the conditions for a six gear transmission in which the transmission lever 6 can be pivoted into four different gates $G_I$ to $G_{IV}$. In order to pivot the transmission lever 6 into the fourth gate $G_{IV}$, an auxiliary piston 69 is again provided in which the bushing 75 is displacably supported. The pressure chamber 68 of the actuator 16' is connected to the solenoid valve 66. The pressure chamber 71 located within the auxiliary piston 69 is connected to the solenoid valve 72.

In the shown neutral position the valves 65 and 72 are switched such that the pressure chambers 67 and 71 are connected to the tank. The solenoid valve 66 is switched such that the pressure chamber 68 between the bottom 70 of the auxiliary piston 69 and the bottom of the cylinder housing 27' is pressurized. Thus, the auxiliary piston 69 is forced against the abutment 79 at which, in the neutral position of the transmission lever 6, the bushing 75 also rests.

When it is desired to pivot the transmission lever 6 counter-clockwise from the neutral position into the gate $G_I$ the solenoid valve 72 is switched into position b so that the hydraulic medium can flow under pressure into the pressure chamber 71. Accordingly, the piston 25' is displaced. The auxiliary piston 69 remains in its abutment position at the housing abutment 79. Via the piston 25' the transmission lever 6 is pivoted in the aforedescribed manner counter-clockwise into the gate $G_I$, whereby the piston 25 is returned together with the bushings 74. The solenoid valve 65 is switched into position a and the solenoid valve 66 is in position b.

In order to pivot the transmission lever 6 from the center position (gate $G_{II}$) into the gate $G_{III}$, the solenoid valve 65 is switched into position b so that the hydraulic medium flows under pressure into the pressure chamber 67. The solenoid valve 72 remains in position a so that the hydraulic medium in pressure chamber 71, upon return of the piston 25', can flow into the tank. The piston 25 is displaced by the pressure of the hydraulic medium, and the transmission lever 6 is pivoted clockwise. The piston 25' is returned and entrains via its annular shoulder 77 the bushing 75. The auxiliary piston 69 is not displaced because it is pressurized by the hydraulic medium within the pressure chamber 68 since the solenoid valve 66 is in position a.

When it is desired to pivot the transmission lever 6 into the gate $G_{IV}$ (reverse gear R), the solenoid valve 66 is switched into position b so that the pressure chamber 68 is connected to the tank. The solenoid valve 72 remains in position a so that the pressure chamber 71 is connected to the tank. The solenoid valve 65 is switched into position b so that the hydraulic medium flows under pressure into the pressure chamber 67. Accordingly, the piston 25 is moved outwardly from the cylinder housing and the transmission lever 6 is pivoted into the gate $G_{IV}$. Accordingly, the auxiliary piston 69 is displaced by the bushing 75 and the piston 25' until the auxiliary piston 69 with its bottom 70 abuts the bottom of the cylinder housing 27'.

As in the previously described embodiments, the piston sections 25a, 25a' of reduced diameter rest at the inner wall of the respective bushing 74, 75.

In order to pivot the transmission lever 6 from the gate $G_{IV}$ into the gate $G_I$, the solenoid valve 66 is switched into position a. The solenoid valve 72 is switched into position b, while the solenoid valve 65 is switched into position a. Accordingly, the auxiliary piston 69, the bushing 75, and the piston 25' are displaced in one combined movement. As soon as the auxiliary piston 69 abuts at the abutment 79, only the bushing 75 and the piston 25' are displaced until the bushings 75 also abuts at the abutment 79. At this point, the piston 25' is still displaced until the piston 25, moved by the spherical end 40 of the transmission lever 6, and the bushing 74 moved by its annular shoulder 76, contact the bottom of the pressure chamber 67.

It is also possible to switch the solenoid valve 66 and 72 sequentially so that first the bushings 75 and the piston 25' are displaced, while the auxiliary piston 69 with its bottom 70 remains in abutment at the bottom of the pressure chamber 68. In this case, the solenoid valve 66 remains first in its position b, while the solenoid valve 72 is switched into position b. When the bushing 75 abuts at the abutment 79, only the piston 25' is displaced until, via the spherical end 40, the bushing 74 and the piston 25 contact the bottom of the pressure chamber 67. Only then the solenoid valve 66 is switched into the position a so that subsequently the auxiliary piston 69 can be displaced until it comes into contact with the abutment 79.

When it is desired to return the transmission lever 6 from the gate $G_I$ into the neutral position (gate $G_{II}$), the solenoid valve 65 is switched into position b. The solenoid valve 72 is switched into position a, while the solenoid valve 66 remains in position a. Accordingly, the bushing 74 and the piston 25 are displaced to the right in FIG. 11 whereby the piston 25' and, via its annular shoulder 77, the bushing 75 are displaced until they abut the bottom 70 of the auxiliary piston 69. Under the pressure of the hydraulic medium within the pressure chamber 68, the auxiliary piston 69 remains in abutment at the abutment 79 at the housing.

In the respectively selected gate the desired gears can be selected with corresponding gear actuators. In transmissions with three gates (FIGS. 8 and 10), the gate $G_I$ includes the gears 1 and 2, the gate $G_{II}$, includes the gears 3 and 4, and the gate $G_{III}$ includes the fifth gear and the reverse gear. In transmissions with four gates (FIGS. 9 and 11), the third gate $G_{III}$ is provided for selecting the fifth and sixth gear while the reverse gear is positioned in the fourth gate $G_{IV}$. Depending on the embodiment of the transmission, the gate $G_{IV}$ may also be positioned adjacent to the gate $G_I$.

Figure 12:
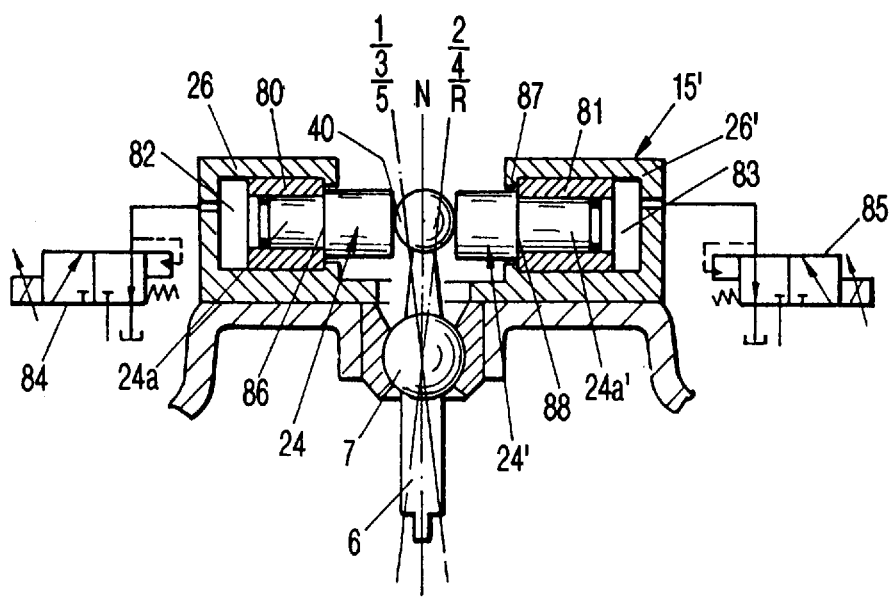
FIG. 12 shows in a representation according to FIG. 11 a gear actuator of the inventive actuating device.

FIG. 12 shows the gear actuators 15, 15' with which the transmission lever 6 is pivoted for selecting the respective gears. The actuators 15, 15' are positioned at right angles to the actuators 16, 16', as shown in FIG. 7. The actuators 15, 15' represented in FIG. 12 are of the same construction as the shift actuators 16, 16' of FIG. 10 for selecting the gate. The pistons 24, 24' have piston sections 24a, 24a' of a smaller diameter which rest at the inner wall of the bushings 80, 81 positioned at the inner wall of the cylinder housing 26, 26'. The bushings 80, 81 are of the same design as the bushings 74, 75. The pistons 24, 24' also have the same designs as the pistons 25, 25'. Proportional solenoid valves 84 and 85 with pressure return are connected to the pressure chambers 82, 83 of the cylinder housings 26, 26'. The transmission lever 6 in the shown neutral position is hydraulically centered. The two solenoid valves 84, 85 are supplied with current such that the pressure chambers 82, 83 are connected to the tank so that the transmission lever 6 is first pivoted with the actuators 16, 16' in the disclosed manner into the desired gate. When it is desired to pivot the transmission lever 6 from the neutral position counter-clockwise in FIG. 12 in order to shift into, depending on the gate selection, the first, the third, or the fifth gear, the solenoid valve 85 is supplied with current such that the hydraulic medium flows under pressure into the pressure chamber 83. Thus, the piston 24' is displaced so that the transmission lever 6 is pivoted counter-clockwise about the ball 7. The piston 24 is returned. Via the annular shoulder 86 the bushing 80 is also entrained. The bushing 81 rests at the housing abutment 87 so that, even when the hydraulic medium within the pressure chamber 83 is pressurized, it cannot be further displaced.

When, on the other hand, the transmission lever 6 is to be pivoted from the neutral position N in the clockwise direction in order to select the second, the fourth, or the reverse gear within a respectively selected gate, the solenoid valve 84 is supplied with current such that the hydraulic medium flows under pressure into the pressure chamber 82. Thus, the piston 24 is displaced so that the transmission lever 6 is pivoted clockwise. The piston 24' is thus returned whereby via the annular shoulder 88 the bushing 81 is entrained. Since the solenoid valve 85 is supplied with current such that the pressure chamber 83 is connected to the tank, the hydraulic medium, as in the aforedescribed embodiments, can be displaced from the pressure chamber 83. The bushing 80 which is pressurized is resting at the housing abutment 89.

While the selection of a gate requires only minimal forces for pivoting the transmission lever, the selection of a gear requires substantially greater forces. When the pistons 24, 24' are pivoted in the described manner and the transmission lever 6 is correspondingly displaced, first the non-represented synchronizing rings of the transmission are displaced in a manner known per se in a direction toward one another until they abut. For this contacting movement a relatively small force is required. However, as soon as the synchronizing rings abut one another, the pressure within the corresponding pressure chambers 82, respectively, 83 must be continuously increased until the rpm compensation in the synchronizing device has been achieved in a manner known per se. During this pressure increase the pistons 24, 24' remain substantially stationary. Only when the synchronization has been achieved, the remaining displacement movement of the corresponding pistons 24, 24' for a corresponding minimal pressure is carried out until positive-locking between the transmission elements to be coupled is realized.

When the transmission lever 6 is returned from the pivoted position into the neutral position, the respectively oppositely arranged pressure chambers 82 and 83 are loaded with the same pressure in order to hydraulically center the transmission lever 6 in the manner disclosed in connection with FIG. 10 in its center position. In this embodiment the transmission lever 6 is thus also hydraulically mechanically centered in the neutral position N. This is achieved with the aforementioned illustrated embodiment and arrangement of the bushings 80, 81 and the pistons 24, 24'. The end faces of the bushings 80, 81 and of the pistons 24, 24' which are loaded by the hydraulic medium are again selected such that the transmission lever 6 is maintained centrally in the center or neutral position. In respect to the centering action, reference is made to the embodiment and description of FIG. 10.

Figure 13:
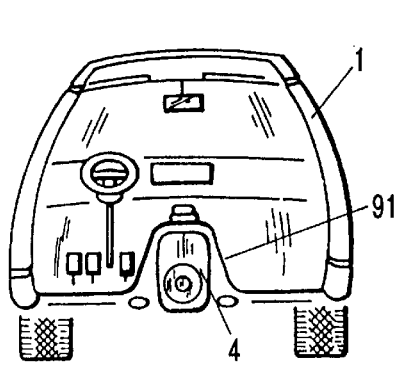
FIG. 13 shows in a schematic representation in cross-section a vehicle with a propeller shaft housing.
Figure 14:
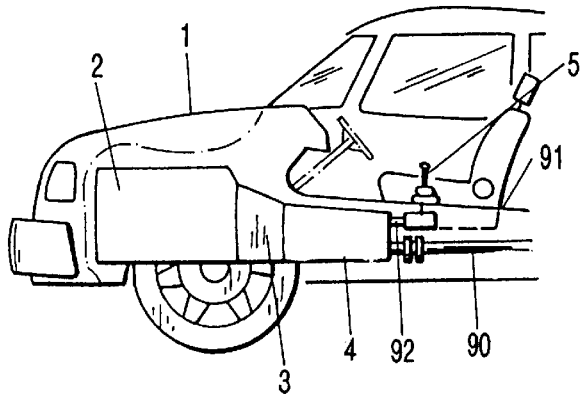
FIG. 14 shows a portion of the vehicle of FIG. 13 in a side view.

FIG. 13 shows a motor vehicle 1 that has a motor 2 positioned above the front axle which has connected thereto, in the travel direction to the rear, the clutch 3 and the transmission 4. A propeller shaft 90 extends from the transmission 4 to the rear, as shown also in FIG. 1. In contrast to the vehicle according to FIG. 1, the transmission is provided in a transmission tunnel 91 which is visible as a floor board projection within the vehicle. While in the embodiment according to FIG. 1 the gear shift lever 5 is directly positioned above the transmission 4, in the vehicle embodiment according to FIGS. 13 and 14 the gear shift lever 5, in the travel direction, is positioned at a distance behind the transmission 4. The gear shift lever 5 extends upwardly from the tunnel 91.

Figure 15:
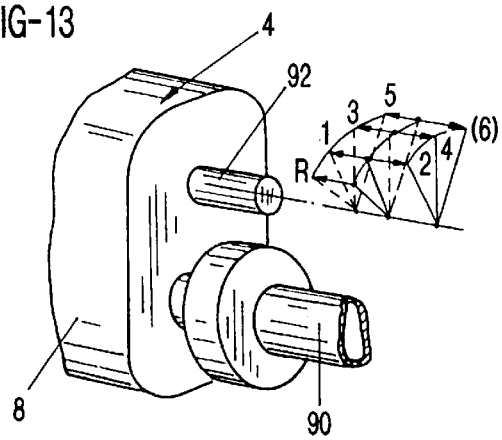
FIG. 15 shows the movement of the selector shaft of the transmission according to FIGS. 13 and 14.

In FIG. 15 the movements of a selector shaft 92 of the transmission 4 is represented in a diagram. The selector shaft 92 extends from the transmission housing 8 and is rotated about its axis and is axially displaced by the gear shift lever 5. Upon rotation of the selector shaft 92, the respective gate is selected. Within the selected gate the selector shaft 92 is then axially displaced in the desired direction in order to shift into the selected gear.

The gear shift lever 5 is to be replaced by an actuating device with which the selector shaft 92 can be rotated and axially displaced as desired.

Figure 16:
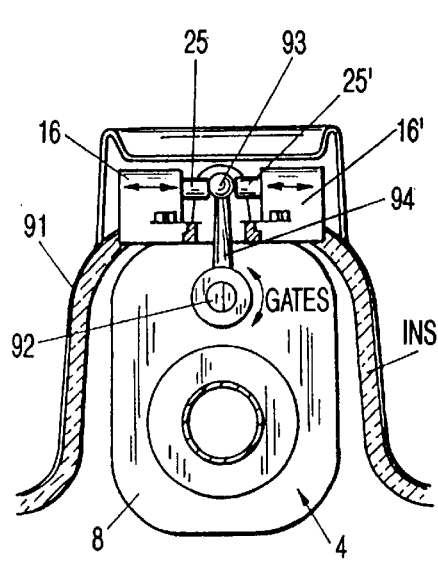
FIG. 16 shows a view of the transmission according to FIG. 13 through 15 with an actuating device according to FIG. 7.
Figure 17:
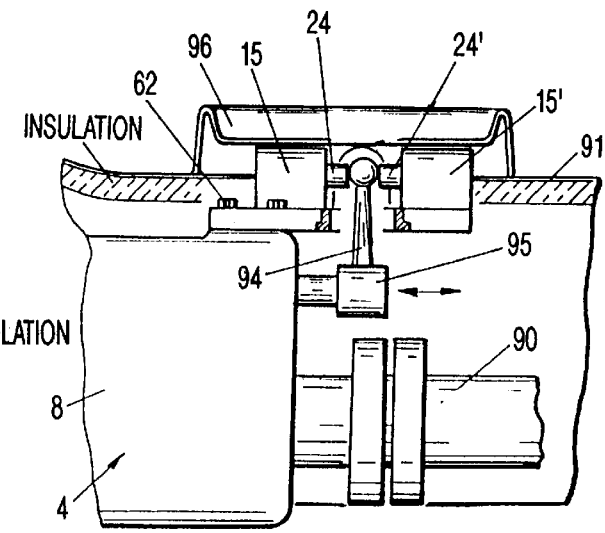
FIG. 17 shows the inventive actuating device according to FIG. 16 mounted to the transmission in a side view with part-sectional view in the longitudinal direction.

FIG. 16 and FIG. 17 show an actuating device according to FIG. 7 which is comprised of actuators 15, 15', 16, 16' that are positioned at right angles to one another. The actuators are connected with a common base plate 62 to the transmission housing 8. The actuators 15, 15', 16, 16' may have a construction according to the embodiments of FIGS. 8 through 12.

With the shift actuators 16, 16' (FIG. 16) the gate is selected while with the gear actuators 15, 15' select in the respective gate the desired gear.

The pistons 24, 24', 25, 25' of the actuators 15, 15', 16, 16' rest at a ball head 93 of a one arm transmission lever 94 which is rotationally and axially fixedly connected to the selector shaft 92. By reciprocating the piston 25, 25', the transmission lever 94 is pivoted in the desired direction for selecting the gate whereby the selector shaft 92 is correspondingly rotated.

By reciprocating the piston 24, 24' of the actuators 15, 15', the transmission lever 94 and thus the selector shaft 92 are axially displaced within the selected gates in order to shift into the desired gear. The function of the actuators has been disclosed above in connection with FIGS. 8 through 12.

The transmission lever 94 is advantageously positioned with a ring 95 on the selector shaft 92. The actuating device with the four actuators is positioned in an area below the shelf 96 that is conventionally provided on the tunnel 91 adjacent to the driver seat within the vehicle. The actuating device, due to its compact design, can be easily positioned within this area and is easily accessible after removal of the support 96.

Figure 18:
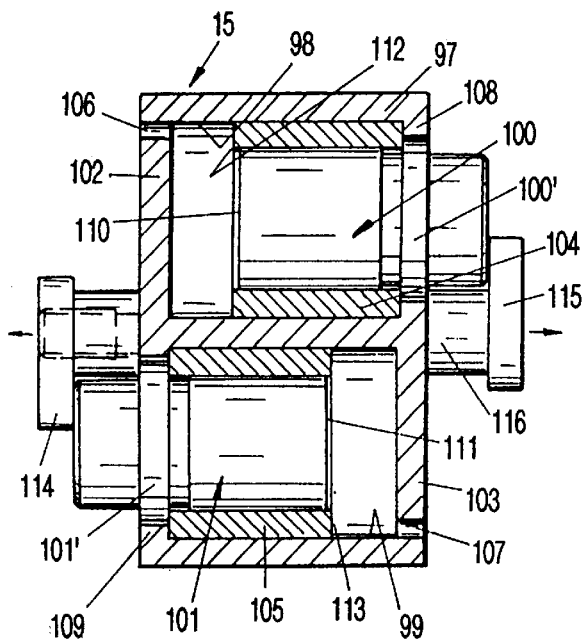
FIG. 18 shows in longitudinal section a gear actuator of a further embodiment of the inventive actuating device.
Figure 19:
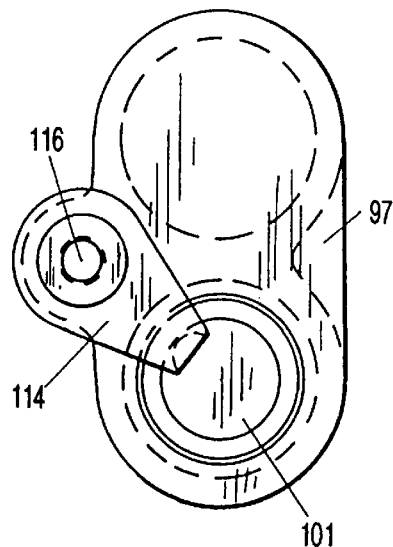
FIG. 19 shows the gear actuator of FIG. 18 in an end view.

FIGS. 18 and 19 show a further embodiment of a gear actuator 15 with which gears can be selected. The gear actuator is of a compact construction and has especially a minimal length and minimal diameter. The actuator 15 has a housing 97 with two axis-parallel extending chambers 98, 99 in which a respective piston 100, 101 is displaceably supported. Both pistons 100, 101 extend in opposite directions to one another past the respective end faces 102, 103 of the housing 97. Within the cylindrical chambers 98, 99 a bushing 104, 105 is provided which rests at the cylinder wall and is displaceable within the chambers 98, 99. The bushings 104, 105 are seated on the pistons 100, 101 which are displaceable in the axial direction relative to the bushings 104, 105.

The chambers 98, 99 are connected via bores 106, 107 to solenoid valves, as disclosed in connection with FIG. 8 through FIG. 12.

In FIG. 18 the central position of the pistons 100, 101 is represented. In this position the bushings 104, 105 rest with their opposed end faces at abutments 108, 109 at the housing. The inner end faces 110, 111 of the piston 100, 101 are advantageously recessed to a small extent relative to the inner end faces 112, 113 of the bushings 104, 105.

The ends of the pistons 100, 101 projecting past the housing end faces 102, 103 rest at a respective bracket 114, 115 positioned on a common support rod 116. The rod 116 is axially displaceably positioned within the housing 97. The brackets 114, 115 extend transverse to the support rod 116.

When the rod 116 is to be displaced to the right in FIG. 18, the chamber 98 is supplied with hydraulic medium, while the lower chamber 99 is connected to the tank. Since in the illustrated central position the bushing 104 rests at the abutment 108, the pressure loading with hydraulic medium of the chamber 98 only effects the displacement of the piston 100. The piston 100 entrains with the bracket 115 the rod 116. Since the lower chamber 99 is not pressurized, the oppositely arranged bracket 114 entrains the piston 101. With a collar 101' the piston 101 entrains the bushing 105 until it abuts the end face 103. The end face 111 of the piston 101 is then spaced at a small distance from the end face 103.

When it is desired to displace the support rod 116 to the left in FIG. 18, the chamber 99 is filled with pressurized hydraulic medium, while the upper chamber 98 is relieved of pressure. Thus, the lower piston 101 is displaced to the left in FIG. 18, and via bracket 114 the support rod 116 is entrained. The bracket 115 at the other end of the support rod 116, in turn, entrains the piston 100 and via its collar 100' the bushing 104. In this manner, the rod 116, depending on which chamber 98, 99 is supplied with pressure, can be axially displaced in the desired direction.

The support rod 116 is axially fixedly connected to the selector shaft 92 of the transmission 4 so that upon displacement of the support rod 116 the selector shaft 92 is also accordingly axially displaced.

Figure 20:
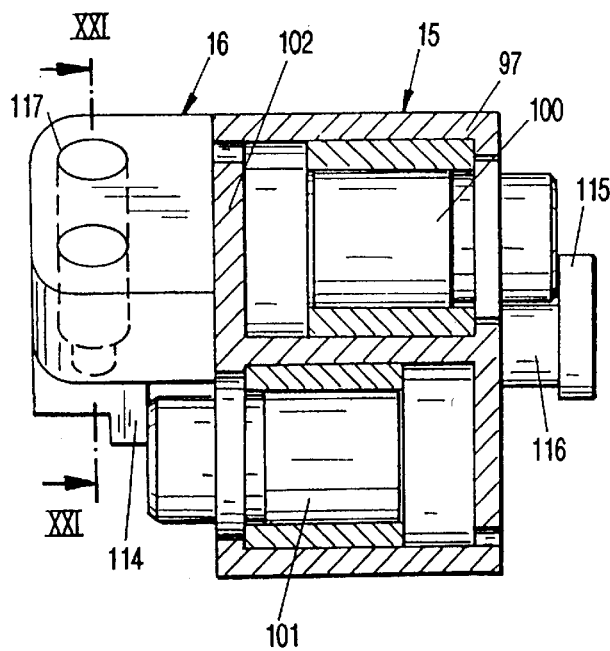
FIG. 20 shows in a longitudinal section a shift actuator which together with the gear actuator according to FIGS. 18 and 19 forms the inventive actuating device.
Figure 21:
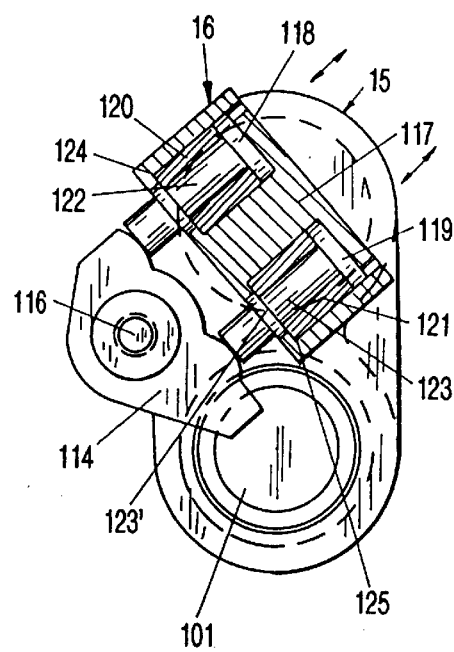
FIG. 21 shows the shift actuator according to FIG. 20 in section along the line XXI to XXI of FIG. 20.

FIGS. 20 and 21 show an actuator 15 of FIGS. 18 and 19 to which is connected a further actuator 16. With the actuator 15 the support rod 116, as explained in conjunction with FIGS. 18 and 19, is axially displaced in order to select the respective gears of the transmission 4. The actuator 16 serves to select the respective gate of the transmission (shift actuator).

The shift actuator 16 is fastened to the end face 102 of the housing 97 of the gear actuator 15. The gear actuator 15 has a housing 117 in which two pressure chambers 118 and 119 are adjacently positioned (FIG. 21). The housing 117 and the housing 97 can be a unitary part of the actuator 15. In the pressure chambers 118, 119 a bushing 120, 121 and a piston 122, 123 are displaceably provided, respectively. The two pressure chambers 118, 119 are positioned axis-parallel to one another. The bushings 120, 121 rest at the cylindrical inner walls of the pressure chambers 118, 119 and are displaceable therein. The bushings 120, 121 are seated on pistons 122, 123 which are displaceable relative to the bushings 120, 121. The two pistons 122, 123 project from the housing 117 and rest at the bracket 114. The pistons 122, 123 are positioned perpendicular to the axis of the support rod 116 on which the bracket 114 and the bracket 115 are rotationally fixedly connected. As shown in FIG. 21, the bracket 114 is a two-arm actuating lever. The two pistons 122, 123 rest at the end face of each lever arm of the bracket or actuating lever 114 on opposite sides of a plane in which the axis of the support rods 116 extends. The two pressure chambers 118, 119 can be supplied with pressure medium in order to be pressurized. Accordingly, one or the other piston 122, 123 can be displaced so that the bracket 114 is pivoted clockwise or counter-clockwise about the axis of the support rod 116. Since the bracket (actuating lever) 114 is rotationally fixedly connected to the support rod 116, the support rod 116 is rotated correspondingly.

When it is desired to pivot the bracket 114 counter-clockwise in the representation according to FIG. 21, the pressure chamber 118 is pressurized with the hydraulic medium while the pressure chamber 119 is relieved of pressure. Since the bushing 120 rests at the abutment 124 of the housing, only the piston 122 is displaced. Accordingly, the bracket 114 is pivoted about the axis of the support rod 116 counter-clockwise. The other piston 123 is accordingly returned by the bracket 114.

Via the collar 123' of the piston 123 the bushing 121 is also returned until the bushing 121 comes to rest at the bottom of the pressure chamber 119. The end face of the piston 123 is recessed to a small extent relative to the end face of the bushing 121.

In FIG. 21 the center position is shown which corresponds to the center position according to FIG. 18. In this center position the two bushings 120, 121 rest at the abutments 124, 125 of the housing 117. Starting with this center position, upon pivoting of the bracket 114 counter-clockwise the bushing 121 is displaced or returned by the piston 123 in the aforedescribed manner until it abuts the bottom of the pressure chamber 119.

When, starting from the center position according to FIG. 21, the pressure chamber 118 is relieved of pressure and pressure medium (hydraulic medium) is introduced into the pressure chamber 119, the piston 123 is moved outwardly so that the bracket 114 is pivoted clockwise about the axis of the support rod 116 so as to rotate the rod 116 clockwise. At the same time, the piston 122 is returned together with a bushing 120 until it abuts the bottom of the pressure chamber 118. The end face of the piston 122 is also slightly recessed relative to the end face of the bushing 120.

In the disclosed manner, a respective gate can be selected with the actuator 16 by rotating the support rod 116. Since the rod 116 is rotationally fixedly connected to the selector shaft 92, the selector shaft 92 is also rotated in the desired amount. Subsequently, by actuating the gear actuator 15, the respective gear within the selected gate can be shifted by axially displacing the support rod 116 and thus the selector shaft 92. For this purpose, the pistons 100, 101 are moved outwardly from the housing, respectively, returned in the manner disclosed in connection with FIGS. 18 and 19. Since this also effects displacement of the bracket 114, the bracke 114, as shown in FIG. 20, widens in the direction of displacement of the support rod 116 so that it is ensured that the pistons 122, 123, even when the bracket 114 is displaced, remain in contact with the bracket 114.

Figure 22:
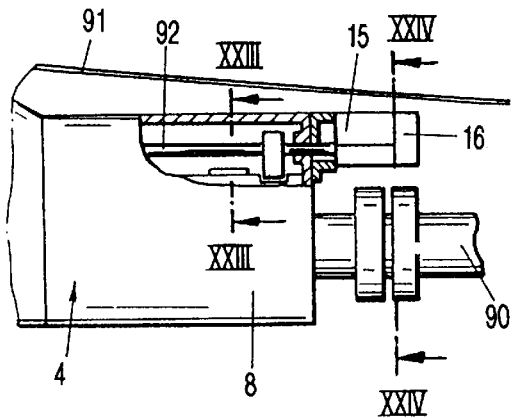
FIG. 22 shows a shift actuator according to FIGS. 20 and 21 mounted to the transmission in a side view and partly in a longitudinal sectional view.
Figure 23:
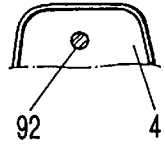
FIG. 23 shows a section along the line A1—A1 in FIG. 22.
Figure 24:
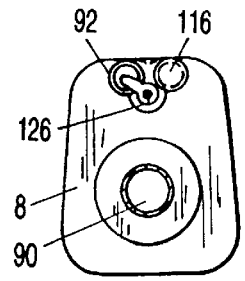
FIG. 24 shows a section along the line A2—A2 of FIG. 22.

FIGS. 22 to 24 show a mounting arrangement of the actuating device at the transmission 4 with the selector shaft 92. The gear actuator 15 for selecting gears is embodied according to the embodiment, of FIGS. 18 and 19 and is fastened to the transmission housing 8. The actuator 16 (FIG. 22) is mounted according to FIGS. 20 and 21 on the actuator 15. The non-represented support rod 116, which can be axially displaced and rotated by the two actuators 15 and 16 in the manner disclosed in connection with FIGS. 18 through 21, is aligned with the selector shaft 92 and is rotationally as well as axially fixedly connected thereto. As shown in FIG. 24, the actuator 15 is mounted such that a plane 126, in which the axes of the two chambers 98, 99 are located, extends horizontally in the mounted position. Accordingly, the actuators 15, 16, viewed in the axial direction of the selector shaft 92, can be positioned within the contour of the transmission housing 8 within the tunnel 91 of the vehicle. As shown in FIG. 22, the actuators 15, 16 of the disclosed arrangement and embodiment can still be mounted within the tunnel 91 even when only a very low mounting space is provided as long as the required length is available.

Figure 25:
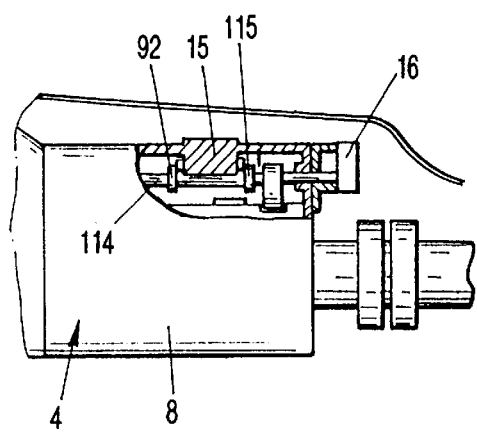
FIGS. 25 to 27 show in representations according to FIGS. 22 to 24 a further embodiment of the shift actuator of the inventive actuating device.
Figure 26:
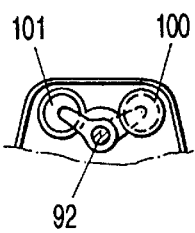
Figure 27:
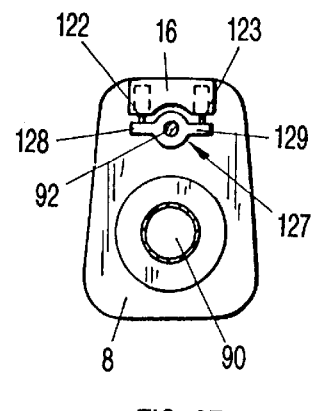

FIGS. 25 through 27 show an embodiment in which the gear actuator 15, with which the gears are to be selected, is positioned within the transmission housing 8. In this case, the brackets 114, 115 are rotationally and axially fixedly directly connected to the selector shaft 92 of the transmission so that the support rod 116 is obsolete. Otherwise, the actuator 15 is of the same construction as the embodiment of FIGS. 18 and 19. By reciprocating the pistons 100, 101, the selector shaft 92 is axially displaced in cooperation with the brackets 114, 115.

In order to be able to rotate the selector shaft 92 about its axis, a bridge 127 (FIG. 27) is connected axially and rotationally fixedly thereto. The bridge 127 comprises two arms 128, 129 engaged by the pistons 122, 123 of the actuator 16. The actuator 16 is embodied according to the embodiment of FIGS. 20 and 21. Depending on which one of the pistons 122 or 123 is extended, the selector shaft 92 is rotated by the bridge 127 clockwise or counter-clockwise. The pistons 122, 123 are positioned perpendicular to the axis of the selector shaft 92. The two bridge arms 128, 129 are positioned diametrically opposite one another. They are embodied such that, upon displacement of the selector shaft 92 by the actuator 15, they will not lose contact with the pistons 122, 123 of the actuator 16. The function of the actuator 16 has been explained in detail in connection with FIGS. 20 and 21. The actuator 16 is mounted to the end face of the transmission housing 8, as shown in FIG. 21.

The different chambers 98, 99 and 118, 119 of the actuator 15 and the actuator 16, respectively, must not be provided in a common housing. It is furthermore possible to provide separate housings for the individual chambers. For example, it is advantageous, as shown in FIG. 26, that for the two pistons 100, 101 of the actuator 15 two separate cylinder housings are provided. Due to this separate embodiment they can be mounted in a space-saving manner within the transmission housing 8. In the same manner, the pressure chambers 118, 119 for the pistons 122, 123 of the actuator 16 can have separate cylinder housings.

The transmission housing 8 can be embodied such that the actuator 15 is mountable by inserting it through an opening within the transmission housing 8. However, it is also possible to embody the housing 8 such that the housing 97 of the actuator 15 is a component of the transmission housing 8. In the same manner, the housing 117 of the actuator 16 can also be a component of the transmission housing 8.

It is also possible to arrange the bridge 127 so as to be rotationally fixed to the selector shaft 92, whereby the bridge 127 however is stationary relative to the transmission housing 8. In this case, the selector shaft 92, upon displacement by the actuator 15, is moved relative to the bridge 127. This has the advantage that the bridge 127 and its two arms 128, 129 can be very small since in such an embodiment the bridge arms 128, 129 remain always within reach of the pistons 122, 123 of the actuator 16.

Figure 29:
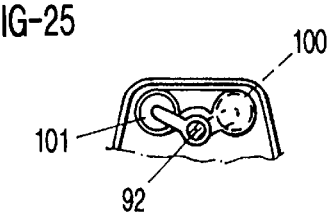
FIG. 29 shows a section along the line $C_1$—$C_1$ of FIG. 28.
Figure 28:
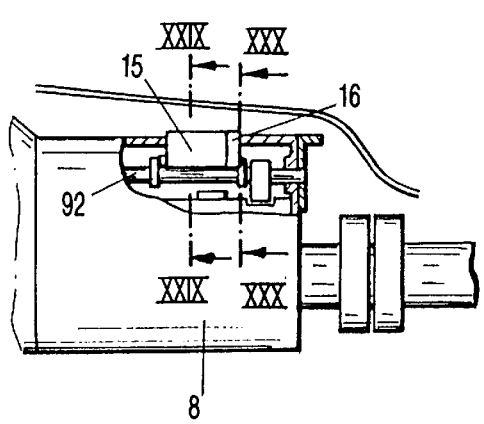
FIG. 28 shows partly in a side view and partly in a longitudinal sectional view an actuating device of the present invention integrated into a transmission.
Figure 30:
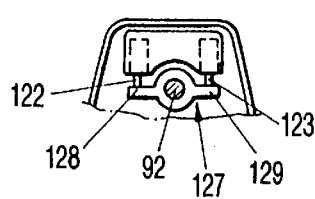
FIG. 30 shows a section along the line $C_2$—$C_2$ of FIG. 28.

The FIGS. 28 to 30 show an embodiment in which the gear actuator 15 for the gear selection as well as the shift actuator 16 for the gate selection are integrated into the transmission housing 8. The gear and shift actuators 15, 16 can be embodied as mounting units which are to be inserted through corresponding openings into the transmission housing 8. The housings 97, 117 of the actuators 15, 16 can also be components of the transmission housing 8. The actuator 15, with which the gears are to be selected by axial displacement of the selector shaft 92, is substantially embodied according to the embodiment of FIGS. 18 and 19. The cylinder housings are positioned, relative to a vertical plane in which the axis of the selector shaft 92 is positioned, on either side of the vertical plane. Otherwise, the gear actuator 15 operates in the same manner as disclosed in connection with FIGS. 18 and 19.

The shift actuator 16 with which the gate selection is achieved is embodied identical to the embodiment of FIGS. 25 through 27. The actuator 16 has two pistons 122, 123 extending perpendicular to the axis of the selector shaft 92. These pistons cooperate with the arms 128, 129 of the bridge 127. By reciprocating the pistons 122, 123, the bridge 127, and thus the selector shaft 92, is pivoted (rotated) about its axis. The operation of the actuator 16 has been explained in connection with FIGS. 20 and 21.

The actuating device according to FIG. 31 through 33 is mounted on the transmission housing 8. The end of the selector shaft 92 projecting from the transmission housing 8 supports in a rotationally fixed and axially fixed manner the transmission lever 94 which, in the mounted position, extends upwardly. The actuating device has a gear actuator 15 with which the selector shaft 92 is axially displaced for selecting the gear. In other respects, the actuator 15 operates identical to the embodiment of FIGS. 18 and 19. By reciprocating the pistons, the support rod 116, which extends parallel to the selector shaft 92, is axially displaced. In the mounted position, the coupling member (sleeve) 130 opens downwardly and receives the ball head 93 provided at the upper end of the transmission lever 94. When the support rod 116 is axially displaced in the manner disclosed in connection with FIGS. 18 and 19, the selector shaft 92 is correspondingly axially displaced via the coupling sleeve 130 and the transmission lever 94 in order to select the desired gear. Of course, the transmission lever 94 can be arranged on the support rod 116 and the coupling sleeve or member 130 can be arranged on the selector shaft 92.

On the side of the actuator 15 facing away from the coupling sleeve 130, the actuator 16 for selecting the gates is flanged to the actuator 15. The two pistons 122, 123, as shown in FIG. 33, project upwardly in the mounted position and rest at the arms 128, 129 of the bridge 127. They are rotationally fixed on the support rod 116. In the displacement direction of the support rod 116, the bridge arms 128, 129 have such a length that upon displacement they will not lose contact with the pistons 122, 123. When the bridge 127 is non-displaceably supported relative to the actuator 15, 16, the bridge arms 128, 129 can be of a small size. As disclosed in connection with FIGS. 20 and 21, the bridge 127 is rotated about the axis of the support rod 116 by displacement of the respective pistons 122, 123. Since the bridge 127 is rotationally fixed on the support rod 116, the support rod 116 is also rotated. The coupling sleeve 130 is also rotationally secured on the support rod 116. Thus, the coupling sleeve 130 is rotated also whereby, via the ball head 93, the transmission lever 94 is pivoted about the axis of the selector shaft 92 and is thus rotated in the desired direction. The transmission lever 94 is so thin that it can carry out the respective pivoting movement relative to the coupling sleeve 130.

FIG. 34 shows a further embodiment of an actuating device with which the selector shaft 92 of the transmission 4 can be rotated about its axis as well as displaced in the axial direction. A coupling member 131 is secured to the end of the selector shaft 92 projecting from the transmission housing, preferably by threading, and thus provides an extension of the selector shaft 92. A conically tapering arm 132 projects perpendicularly to the coupling member 131 and supports at its free end a ball head 133. It extends into a downwardly open ball receiving unit of a sleeve 134. The axis of the sleeve 134 extends perpendicularly to the selector shaft 92. The sleeve 134 is connected to the free end of the support rod 116 positioned between the two cylinder housings 135, 136 of the actuator 15. The two cylinder housings 135, 136 extend parallel to one another and parallel to the selector shaft in the area above the selector shaft 92. The pistons 100, 101 project from the cylinder housings 135, 136. The piston 100 rests at one arm 128 of the bridge 127 which is rotationally fixed on the support rod 116. The piston 111 cooperates with an arm 137 extending radially from the sleeve 134 and perpendicularly to the selector shaft 92. The arm 137 is positioned in an area above the selector shaft 92. The support rod 116 connects the bridge 127 to the sleeve 134.

As has been explained in connection with FIGS. 18 and 19, with a corresponding reciprocation of the pistons 100 and 101, the support rod 116 is axially displaced. The bridge 127 as well as the sleeve 134 are rotationally and axially fixedly connected to the support rod 116 and are thus entrained upon axial displacement. Since the arm 132 with its ball head 133 engages the sleeve 134, the selector shaft 92 is axially displaced by these components upon displacement of the support rod 116.

The piston 122 acts on the bridge arm 128 and the piston 123 acts on the bridge arm 129. In contrast to the embodiment according to FIGS. 20 and 21, the two pistons 122, 123 are positioned in spatially separate cylinder housings 138 and 139. In FIG. 34 the cylinder housing 138 is represented in dashed lines in a position that is pivoted by 180°. In the mounted position the cylinder housing 138 is positioned in an area above the bridge arm 128. Thus, the two pistons 122, 123 engage from below the bridge arms 128, 129. Since the bridge 127 is entrained upon axial displacement of the support rod 116 is entrained, the bridge arms 128, 129 are provided with widened portions within the contact area of the pistons 122, 123 so that the pistons, upon axial displacement of the support rod 116, cannot become disengaged from the bridge arms 128, 129. With corresponding displacement of the piston 122 or 123 the bridge 127 is rotated. Since it is rotationally fixed to the support rod 116, the support rod 116 and thus also the sleeve 134 are rotated. Since the ball head 133 of the arm 132 rests at the inner wall of the receiving unit of the sleeve 134, the pivot movement of the sleeve 134 also pivots the arm 132. Accordingly, the selector shaft 92 is rotated in the desired manner about its axis.

With the actuators 15 and 16, which form the actuating device, the selector shaft 92 can be rotated about its axis in a simple manner for selecting the gate and can be axially displaced for selecting the gear. The switching forks 140 cooperate in a manner known per se with the selector shaft (only one fork is represented in FIG. 34).

The actuator 16 with the cylinder housings 138, 139 can, of course, be also embodied according to the embodiment of FIGS. 20 and 21. It is also possible, for respective mounting conditions, to provide the cylinder housing 138 in the position represented in dashed lines in FIG. 34. In this case, the two cylinder housings 138, 139 are positioned on different sides of the bridge 127.

Figure 35:
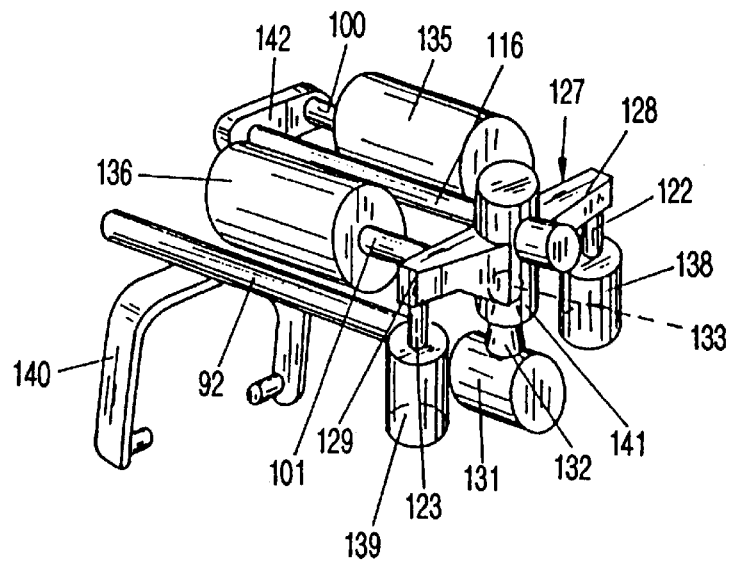
FIG. 35 shows in a further embodiment of the inventive actuating device in a perspective representation.

In the embodiment according to FIG. 35 the bridge 127, in contrast to the previous embodiments, is positioned at the end of the selecting shaft 92 exterior to the transmission housing. In this case, the bridge 127 is provided with a sleeve-shaped projection 141 which is open in the downward direction and receives the ball head 133 of the arm 132 of the coupling member 131. The pistons 122, 123 of the cylinder housings 138, 139 abut the underside of the bridge arms 128, 129 which, as in the previous embodiment, extend perpendicularly to the selector shaft 92 in an aligned arrangement. The bridge 127 is rotationally fixedly connected to the support rod 116. When the pistons 122, 123, as disclosed in connection with FIGS. 20 and 21, are reciprocated, the bridge 127 is pivoted in the corresponding direction so that the support rod 116 is rotated about its axis. Due to the engagement of the arm 132 at the projection 141, the selector shaft 92 is rotated correspondingly about its axis.

The support rod 116 is provided at its end facing away from the bridge 127 with a bracket 142 that extends transversely to the rod and which is engaged by the piston 100. The other piston 101 engages the other bridge arm 129. As in the previous embodiment, the pistons 100, 101 extend at a right angle to the pistons 122, 123. When the pistons 100, 101 are reciprocated, as explained in connection with FIGS. 18 and 19, the support rod 116 is axially displaced via the bracket 142, respectively, via the bridge 127. Accordingly, via the projection 141 and the coupling member 131 the selector shaft 92 is axially displaced. As in the previous embodiment, the pistons 100, 101 are provided in spatially separate cylinder housings 135, 136.

The two cylinder housings 138, 139 can, of course, also be embodied according to the embodiment of FIGS. 20 and 21. Furthermore, it is possible to combine all cylinder housings 135, 136, 138, 139 in a common housing. Such an embodiment is also possible for the embodiments according to FIGS. 7 through 12 and 16 through 34.

Figure 36:
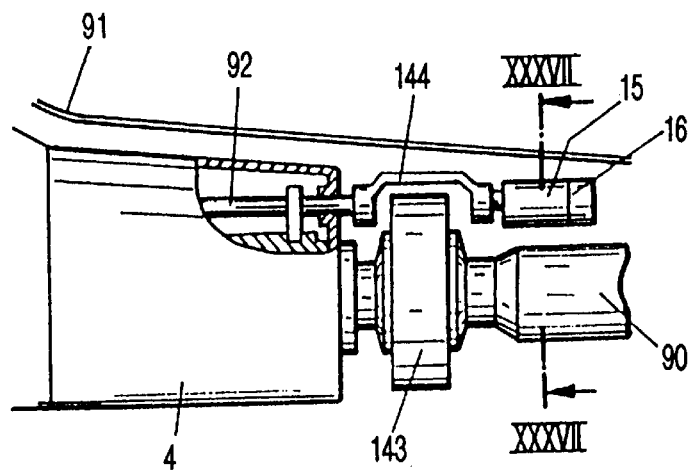
FIG. 36 shows partly in a side view and partly in a longitudinal sectional view a further embodiment of the inventive actuating device with a bridge element bridging a compensation element.

FIG. 36 shows an embodiment in which the drive connection between the output shaft of the transmission 4 and the propeller shaft 90 comprises a compensation element 143. Since the compensation element 143 extends to the level of the selector shaft 92, the support rod 116 of the actuating device is connected by a bridge element 144 in rotationally fixed and axially fixed manner to the selector shaft 92 of the transmission 4. The bridge element 144 is of a U-shaped construction and bridges the compensation element 143 such that, upon axial displacement of the support rod 116 and of the selector shaft 92, it does not come into contact with the compensating element 143. The actuating device comprises an actuator 15 for selecting the gears and an actuator 16 for selecting the gates. The two actuators 15, 16 can be embodied according to FIGS. 20 and 21. Both actuators 15, 16 may have a common housing.

Figure 37:
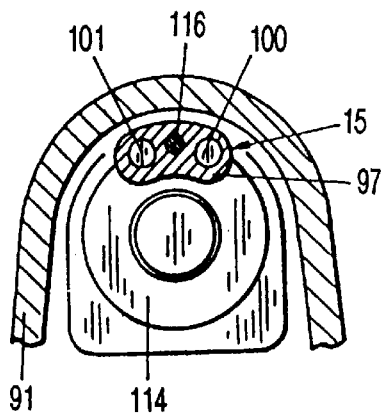
FIG. 37 shows a section along the line A—A of FIG. 36.

As shown in FIG. 37, the housing 97 of the actuator 15 is advantageously arc-shaped when seen in cross-section. Thus, the actuator 15 can also be positioned in a rearward area of the tunnel 91 of the vehicle. The housing 117 (FIGS. 20 and 21) of the actuator 16 is correspondingly designed.

Figure 38:
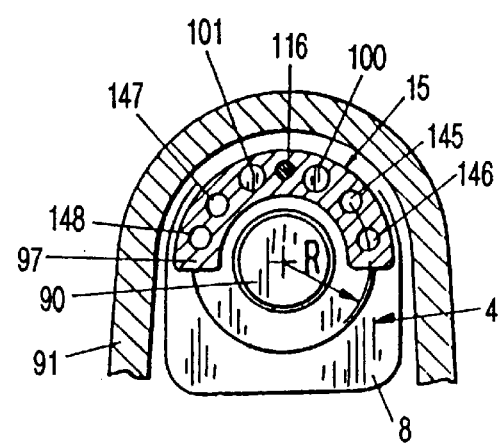
FIG. 38 shows in a representation according to FIG. 37 a further embodiment of the inventive actuating device.

FIG. 38 shows a further embodiment of the actuating device according to FIGS. 36 and 37. The housing 97 of the actuator 15, in comparison to previous embodiments, is elongate so that, in the axial direction of the selector shaft of the transmission 4, a semi-circular shape is provided. The support rod 116 is axially displaced by the two pistons 100, 101 of the actuator 15 in the manner disclosed above. At the end of the piston 100 facing away from the support rod 116 a mounting space 145 for a solenoid valve coordinated with the piston 100 is provided within the housing 97. A further mounting space 146 for a non-represented solenoid valve coordinated with the piston of the actuator 16 is provided. At the other side a mounting space 147 for a solenoid valve of the piston 101 and a mounting space 148 for a non-represented solenoid valve for the actuator 16 are provided. The axes of the mounting spaces 145 to 148, of the pistons 100, 101, and of the support rod 116 are positioned on an imaginary circle about the axis of the propeller shaft 90. The housing 97 is embodied such that it is arc-shaped and surrounds at a small distance the propeller shaft 90, when viewed in the axial direction of the propeller shaft. The housing 97, viewed in the axial direction of the propeller shaft 90, is within the contour of the transmission housing 8. Thus, the actuating device can be mounted without difficulties within the tunnel 91 of the vehicle. This embodiment provides a very compact construction. The support rod 116 is rotationally and axially fixed to the selector shaft 92 of the transmission. With the actuating device the selector shaft 92 can thus be rotated in the described manner for selecting the gate and axially displaced for selecting the gear. In this embodiment, the two actuators 15, 16 may also have a common housing.

Figure 39:
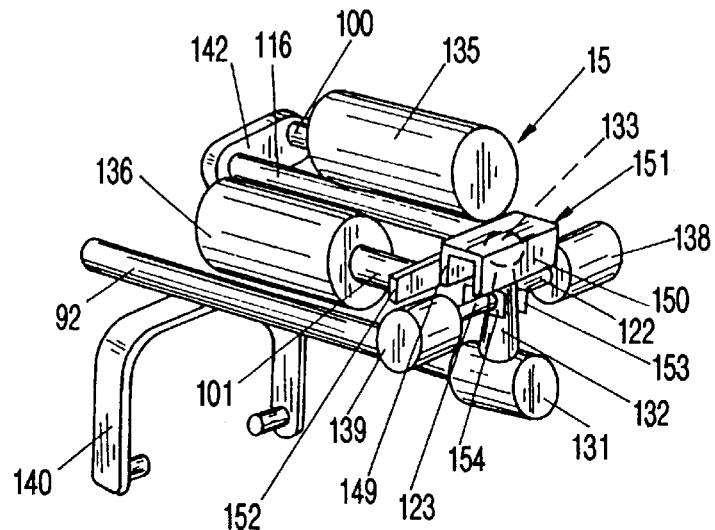
FIG. 39 shows in a perspective representation a further embodiment of an inventive actuating device.

The actuating device according to FIG. 39 is of a similar construction as the embodiment according to FIG. 35. One end of the selector shaft 92 is provided with a coupling member 131 that has a transversely extending arm 132 with a ball head 133. The coupling member 131 is rotationally fixed and axially fixed on the selector shaft 92. The ball head 133 rests at facing inner sides of two legs 149 and 150 of a U-shaped profiled member 151. The legs 149, 150 extend perpendicular to the axis of the selector shaft 92. One end of the support rod 116 is fastened to one leg 149 of the profiled member 151. The rod 116 is arranged between the two cylinder housings 135 and 136 of the actuator 15. The two cylinder housings 135, 136 are positioned parallel to one another as well as parallel to the selector shaft 92. The leg 149 of the profiled member 151 comprises an extension arm 152 which extends perpendicular to the selector shaft 92 and is engaged by the piston 101 of the cylinder housing 136. The piston 100 of the cylinder housing 135 engages the bracket 142 extending perpendicular to the axis of the selector shaft 92 and fixedly connected to the support rod 116.

The pistons 100, 101, as has been explained in connection with FIGS. 18 and 19, are reciprocated for displacing the support rod 116. When doing so, the profiled member 151 is entrained so as to entrain the coupling member 131 via the arm 132 and to thus axially displace the selector shaft 92. In this manner, the gears of the transmission can be selected.

In the area below the profiled member 151 the pistons 122, 123 of the cylinder housing 138, 139 engage the arm 132 from diametrically opposed positions. The axis of the aligned pistons 122, 123 are perpendicular to the selector shaft 92 and to a horizontal plane. By reciprocating the respective pistons 122, 123 the arm 132 is pivoted about the axis of the selector shaft 92. Accordingly, the ball head 133 is displaced between the legs 149, 150 of the profiled member 151. By rotating the selector shaft 92, the desired gate is selected in the aforedescribed manner.

In order to ensure that the pistons 122, 123 during displacement of the selector shaft 92 will not become disengaged from the arm 132, the arm 132 has widened support surfaces 153, 154 which extend in the direction of displacement of the selector shaft 92. The cylinder housings 138, 139 are positioned in the area between the profiled member 151 and the coupling member 131.

Figure 39A:
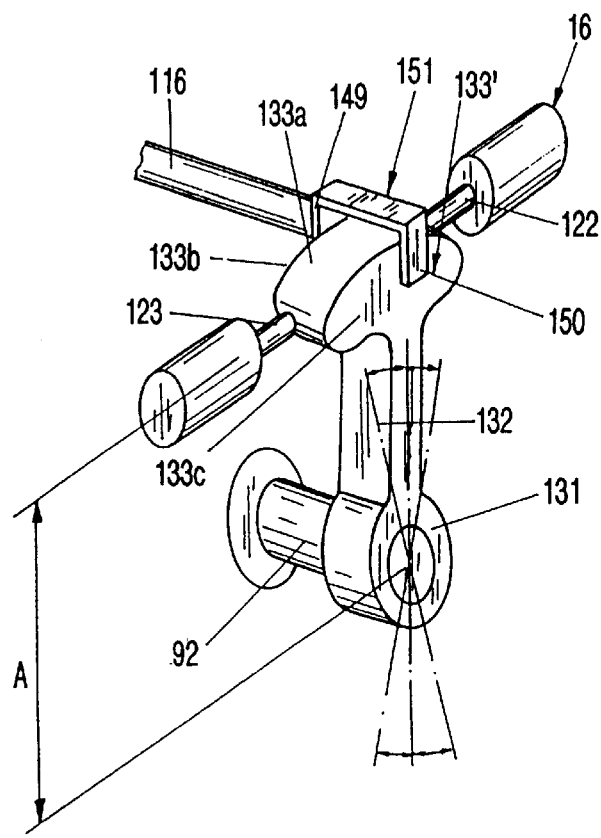
FIG. 39a shows a portion of a further embodiment of the inventive actuating device.

In the embodiment according to FIG. 39a the arm 132 is provided with a widened portion 133' instead of the aforementioned ball head. The widened portion 133' has an arc-shaped curved end face 133a. The widened portion 133' is bridged by a U-shaped profiled member 151 with two legs 149, 150 that are spaced at a small distance from the two side surfaces 133b, 133c of the widened portion 133'. The pistons 122, 123 of the actuator 16 engage the widened portion 133'. The profiled member 151 is fixedly connected with its leg 149 to the support rod 116 of the non-represented actuator 15. By displacing the support rod 116 with the actuator 15, the selector shaft 92 is axially displaced in the aforementioned manner by the U-shaped profiled member 151 and the arm 132 in order to select the desired gear. By reciprocating the pistons 122, 123 of the actuator 16 the arm 132 is pivoted in the desired direction so that via the coupling member 131 the selector shaft 92 is rotated in the desired direction for selecting a respective gate.

In this embodiment the distance between the imaginary axis of the two pistons 122, 123 and the axis of the selector shaft 92 is indicated with reference letter A. For the rotation of the selector shaft 92 this distance A can be used as leverage. Due to the great length of this leverage arm A, a very high positioning precision with a simultaneous force reduction of the force required to generate the same torque is realized. In the previous embodiment according to FIG. 39 only half of the leverage is used because the pistons 122, 123 of the actuator 16 engage the arm 132 approximately at half its length.

Figure 39B:
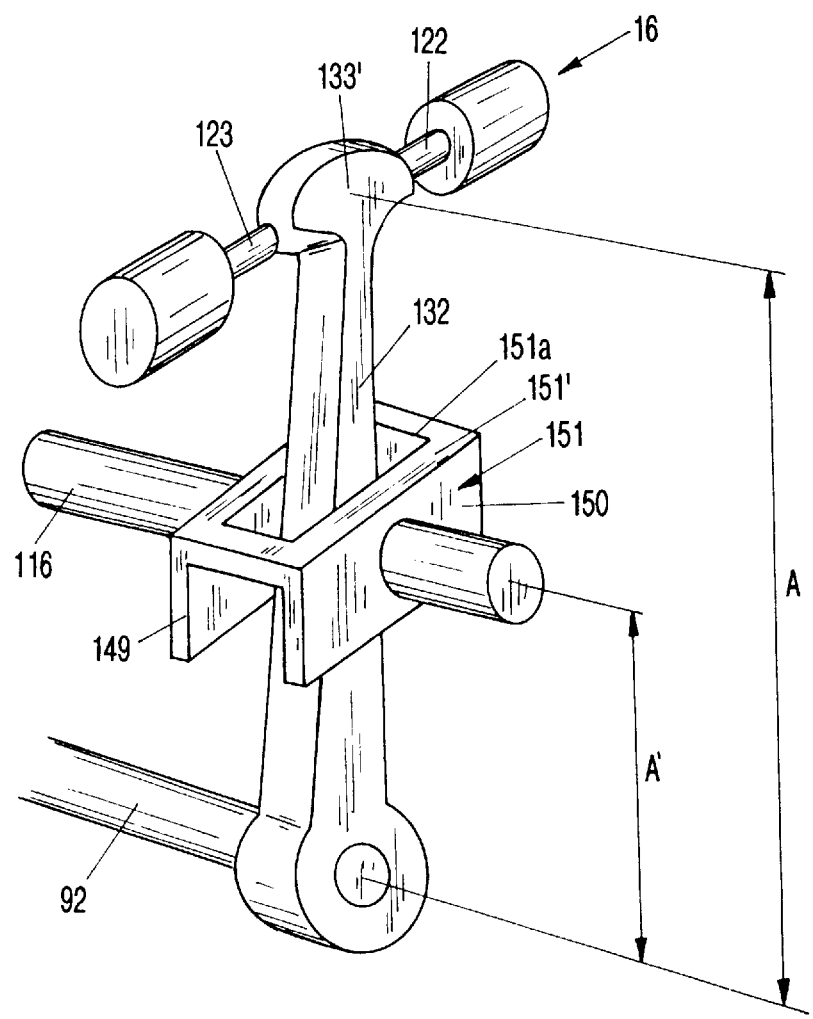
FIG. 39b shows a portion of a further embodiment of the inventive actuating device.

FIG. 39b shows a further embodiment of the actuating device according to FIG. 39a. On the support rod 116 the U-shaped profiled member 151 is fastened that comprises the two legs 149 and 150. The transverse stay 151' of the profiled member 151 has a penetrating opening 151a through which the arm 132 supported on the selector shaft 92 projects. It comprises at its upper free end the widened portion 133' at which the two pistons 122, 123 of the actuator 16 engage. The two legs 149, 150 of the profiled member 151 are positioned at opposite sides of the arm 132 with minimal play. In order to select a gear, the support rod 116 is axially displaced in the aforedescribed manner. Via the profiled member 151 and the arm 132, the selector shaft 92 is correspondingly axially displaced. In order to select the desired gate, the pistons 122, 123 are reciprocated in a corresponding amount so that the arm 132 is pivoted in the desired direction within the penetrating opening 151a of the profiled member 151 and the selector shaft 92 is accordingly rotated about its axis.

In this embodiment a long leverage arm A also results for pivoting the arm 132 which leverage arm A is substantially greater than the effective leverage arm A' for displacing the selector shaft 92 which corresponds to the axial distance between the support rod 116 and the selector shaft 92.

Figure 40:
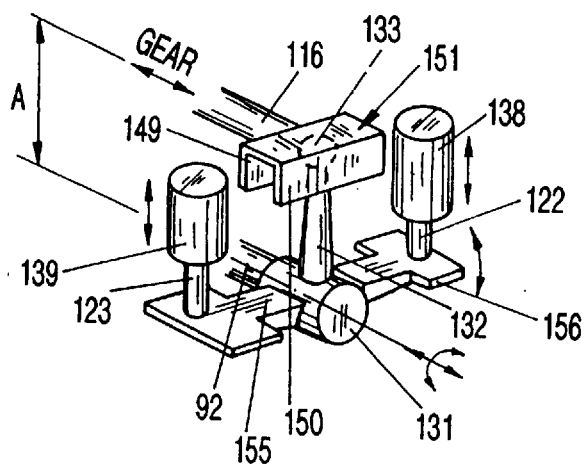
FIG. 40 shows in a perspective representation a further embodiment of an inventive actuating device.

FIG. 40 shows an actuating device that is embodied similarly to the embodiment according to FIG. 39, respectively, FIG. 39a. The coupling member 131 comprises diametrically oppositely arranged arms 155, 156 which are rotationally fixed on the coupling member 131 and extend perpendicularly to the selector shaft 92. The free ends of the two arms 155, 156 are provided with widened portions 157, 158 extending in the direction of displacement of the selector shaft 92. They are engaged by the pistons 122, 123 of the cylinder housings 138, 139. In contrast to aforementioned embodiments, the pistons 122, 123 extend parallel to the arm 132 which engages with its ball head 133 between the legs 149, 150 of the U-shaped profiled member 151. Otherwise, the actuating device is of the same construction as the embodiment of FIG. 39. With the pistons 100, 101 of the cylinder housings 135, 136 (FIG. 39) the support rod 116 and thus the profiled member 151 are displaced. Via the arm 132 and the coupling 131 the selector shaft 92 is accordingly displaced. The widened portions 157, 158 at the ends of the arms 155, 156 extend in the displacement direction of the selector shaft 92 to such an extent that the pistons 122, 123 even for a displaced selector shaft 92 will remain in contact with the widened portions. Due to the disclosed reciprocation of the respective pistons 122, 123, the coupling member 131 and thus the selector shaft 92 is rotated about its axis whereby the ball head 133 of the arm 132 is displaced between the legs 149, 150 of the profiled member 151. Due to this rotation of the selector shaft 92, the respective gate is selected. Subsequently, the desired gear can be selected in the selected gate by displacing the selector shaft 92.

It is possible to displace the selector shaft 92 upon axial displacement relative to the coupling member 131. In this case, the widened portions 157, 158 at the ends of the arms 155, 156 are not required. The arms can thus be of a very narrow construction. Such an embodiment is, of course, also possible in connection with the embodiment of FIG. 39. Furthermore, the two cylinder housings 138, 139 can also be provided as a one part construction. Also, as explained in connection with other embodiments, it is possible to embody all housings of the pistons 100, 101, 122, 123 as a one part (unitary) housing.

In the embodiment according to FIG. 40, the entire leverage arm A, which corresponds to the axial distance between the selector shaft 92 and the support rod 116, can be used for rotation of the selector shaft 92, as has been explained in connection with FIG. 39a. Furthermore, the arms 155, 156 can be of a great length so that during reciprocation of the piston 122, 123 correspondingly long and effective leverage arms are provided. Thus, the actuating force of the cylinder housings 138, 139 for producing the same torque can be reduced. Due to the great leverage an increased stroke for the pistons 122, 123 is achieved which results in an increased positioning precision.

Figure 41:
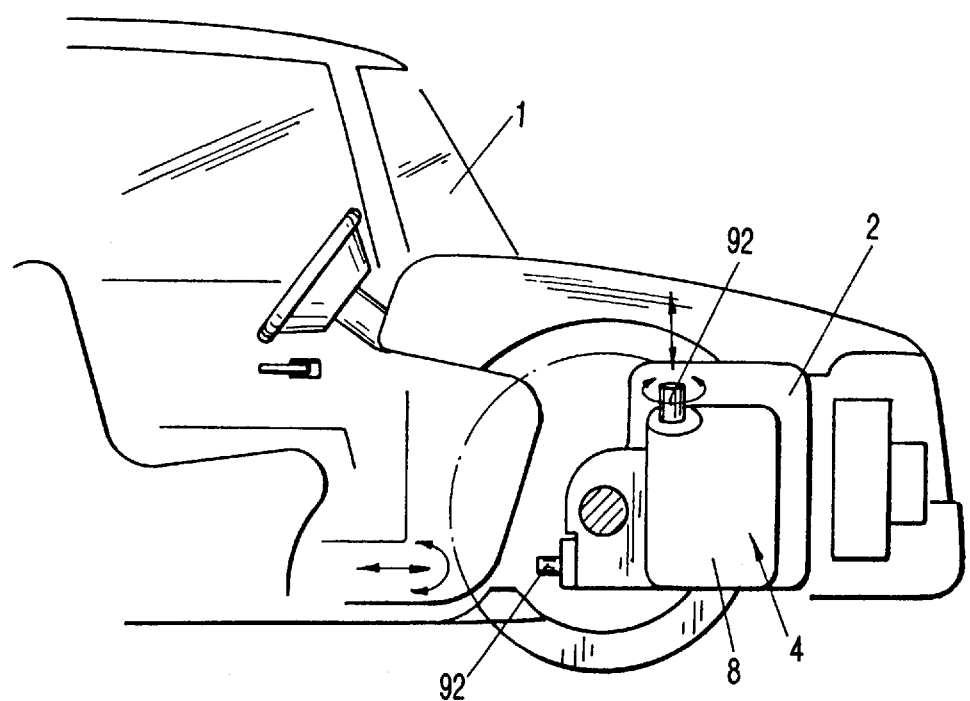
FIG. 41 shows in a schematic representation the forward part of a vehicle with a transversely arranged front engine and a transversely mounted transmission.

FIG. 41 shows a vehicle 1 with a transversely positioned front engine 2 and a transmission 4 the selector shaft 92 of which extends either upwardly or to the rear from the transmission housing 8. In both cases only a very small mounting space is available in order to position the actuating device.

Figure 42:
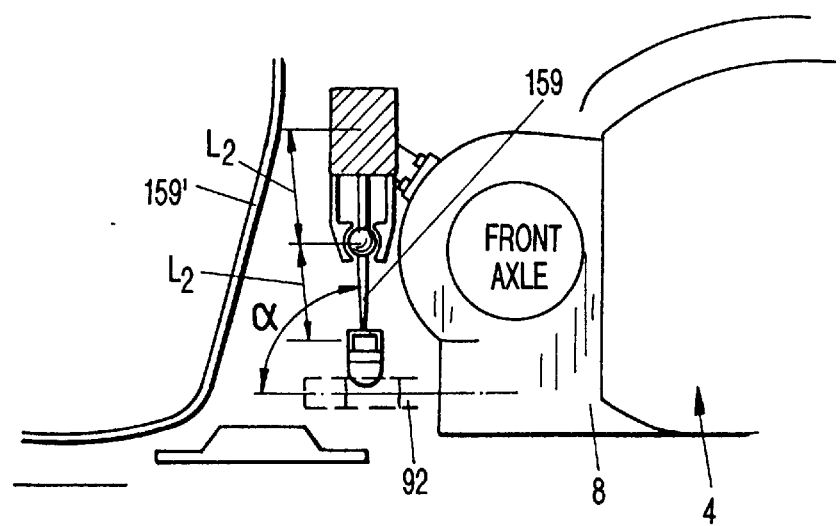
FIG. 42 shows in a schematic representation the connection of the inventive actuating device to the transmission of the front engine according to FIG. 41.

FIG. 42 shows an actuating device for connection to the selector shaft 92 extending to the rear from the transmission housing 8. The actuating device is positioned between the inclined floor board 159 of the vehicle and the transmission 4. The corresponding actuator of the actuating device is positioned at an angle α to the selector shaft 92 so that for the given spatial conditions an optimal mounting is ensured. The selector shaft 92 is pivotably connected via a two-arm spherically supported switching lever 159 to the actuating device. With the actuating device the selector shaft 92 can be axially displaced for selecting a gear and rotated about its axis for selecting the desired gate. In FIG. 42 the different displacement positions of the selector shaft 92 are indicated. With a corresponding design of the leverage $L_1$ and $L_2$ of the shifting lever 159, the stroke of the actuators can be reduced such that the advantages of the hydraulic system, i.e., a high force density, can be fully taken advantage of. Thus, in the narrow mounting space between the floor board 159' and the differential unit of the vehicle 1, an inventive actuating device of the smallest possible construction can be provided.

Figure 43:
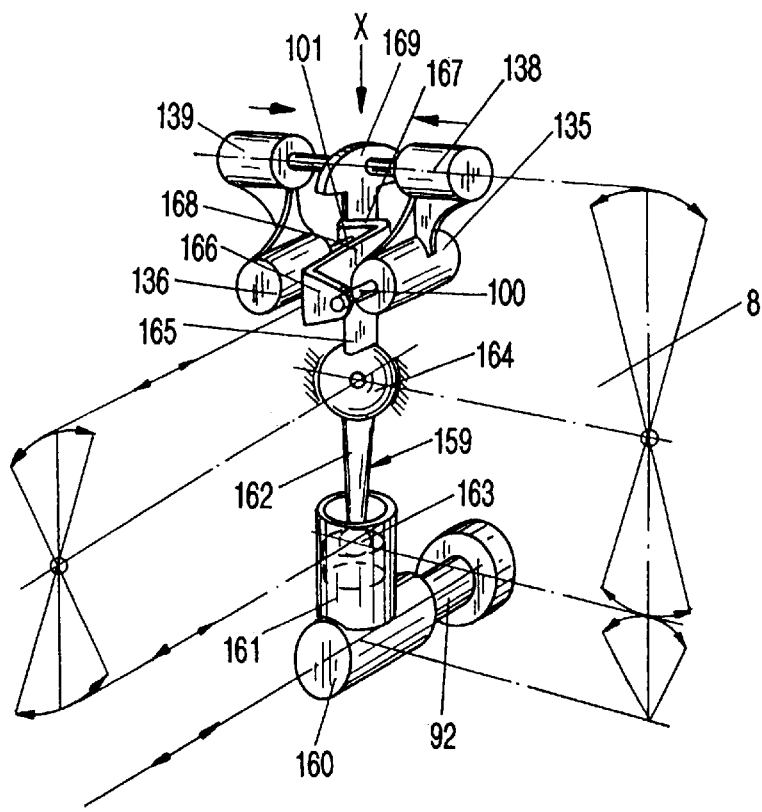
FIG. 43 shows in a perspective and schematic representation a further embodiment of the inventive actuating device which is especially suitable for mounting according to FIG. 42.

FIG. 43 shows a further embodiment of such an actuating device. The coupling member 160 is positioned on the selector shaft 92 that extends from the transmission housing 8 to the rear in the horizontal direction. From the coupling member 160 a sleeve 161 projects that in the mounted position extends upwardly. The arm 162 of the transmission lever 159 engages the sleeve 161. The arm 162 supports at its free end a ball head 163 which rests at the inner wall of the sleeve 161. During pivoting, the arm 162 is displaceable to a limited extent in the axial direction relative to the sleeve 161. The arm 162 tapers in direction toward the ball head 163. The arm 162 of the transmission lever 159 is spherically supported via a ball 164 within the vehicle. The other arm 165 of the transmission lever 159 is embodied as a formed piece. The arm 165 has a bracket 166 that extends transverse to the selector shaft 92 and is engaged by the piston 100 of the cylinder housing 135. The axis of the piston 100 is positioned above the selector shaft 92 and extends parallel to it.

The piston 101 of the other cylinder housing 136 rests at a further bracket 167 that extends parallel to the bracket 166. The two brackets 166, 167 extend perpendicularly from the center piece 168 that extends in the axial direction of the selector shaft 92 and is part of the transmission lever arm 165. The two cylinder housings 135, 136 extend parallel to one another and parallel to the selector shaft 92.

Figure 44:
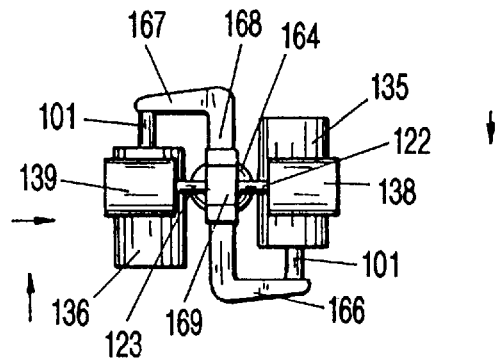
FIG. 44 shows a view in the direction of arrow X in FIG. 43.

The arm 165 comprises a further bracket 169 that is arranged in an area above the two brackets 166, 167 and extends parallel to the selector shaft 92. As shown in FIG. 44 in a plan view onto the actuating device according to FIG. 43, the bracket 169 extends perpendicularly to the brackets 166, 167 which extend in opposite directions from the center piece 168. The two oppositely arranged sides of the bracket 169 are engaged by the pistons 122 and 123 of the cylinder housings 138 and 139. The pistons 122, 123 are positioned aligned with one another and perpendicular to the cylinder housings 135 and 136. The cylinder housings 138, 139 are positioned in an area above the cylinder housing 135, 136.

In order to select the desired gate, the piston 122 or 123 is moved in the aforedescribed manner by the hydraulic medium so that the switching lever 159 is pivoted about is spherical bearing (ball) 164. The lower arm 162 of the transmission lever 159 engages and entrains the sleeve 161 so that the selector shaft 92 is rotated about its axis.

As soon as the desired gate has been selected, the piston 100 or 101 is returned in the aforementioned manner by the hydraulic medium so that the transmission lever 159 is now pivoted about the spherical bearing 164 within a vertical plane in which the axis of the selector shaft 92 extends. The arm 162 thus displaces the selector shaft 92 in the desired direction for selecting the desired gear. During reciprocation of the pistons 100, 101, the ball (spherical bearing) 164 is secured against rotation about the longitudinal axis of the transmission lever 159 in a suitable manner. Since the arm 162 tapers and rests only with the ball head 163 at the inner wall of the sleeve 161, the required pivoting movements of the transmission lever 159 for gate and gear selection can be performed without difficulties. In FIG. 43 the corresponding pivot angles of the transmission lever 159 upon actuation of the pistons 122, 123 (gate selection) and upon actuation of the piston 100, 101 (gear selection) are shown.

The cylinder housings 135, 136, 138, 139 can be combined together with the spherical bearing 164 of the transmission lever 159 in a common housing.

Figure 45:
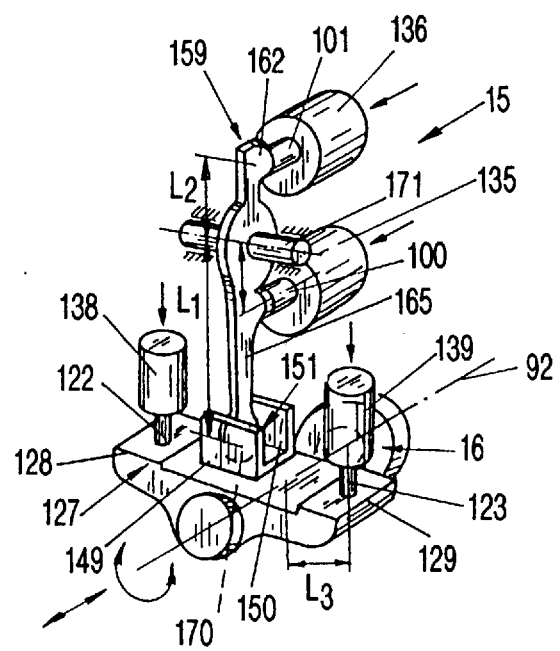
FIG. 45 shows in a schematic representation a further embodiment of an inventive actuating device for mounting according to FIG. 42.

In the embodiment according to FIG. 45, the bridge 127 is rotationally and axially fixedly connected to the selector shaft 92. Its arms 128, 129 are positioned on opposite sides of the selector shaft 92. The pistons 122, 123 of the cylinder housings 138, 139 rest on these bridge arms 128, 129. Their axes are positioned parallel to one another and perpendicular to the selector shaft 92. Due to the disclosed reciprocation of the respective pistons 122 or 123, the bridge 127 and thus the selector shaft 92 are rotated. In this manner the gate selection is achieved.

In the area between the two cylinder housings 138, 139 the U-shaped profiled member 151 is seated on the bridge 127. The legs 149, 150 of the profiled member 151 extend upwardly and perpendicularly to the selector shaft 92. At the facing inner sides of the legs 149, 150, a ball head 170 is positioned which is provided at the free end of the lower arm 165 of the two-arm transmission lever 159. It is seated on an axle 171 which is positioned in the area above the bridge 127 and extends perpendicularly to the selector shaft 92. Instead of the axle 171 it is also possible to provide a shaft which is supported with its ends at the vehicle. The transmission lever 159 is rotationally fixedly connected thereto. In the area above the axle 171, the piston 100 of the cylinder housing 135 engages the lower arm 165 and the piston 101 of the cylinder housing 136 engages the upper arm 162. The two pistons 100 and 101 extend parallel to one another and parallel to the selector shaft 92. The two cylinder housings 135, 136 are positioned vertically above one another. In the contacting area of the pistons 100, 101 the two arms 162, 165 of the transmission lever 159 are of a widened construction in order to ensure a reliable pivoting of the transmission lever 159 about the axis of the shaft 171.

By reciprocating the pistons 122, 123 in the manner disclosed above, the bridge 127 is rotated in the desired direction so that the selector shaft 92 is rotated about its axis for selecting the gate. Subsequently, in the manner disclosed above, the piston 100 or 101 is moved so that the transmission lever 159 is pivoted about the axis of the axle 171. Due to the engagement of the lower arm 165 at the profiled member 151, the selector shaft 92 is displaced in the desired direction by the bridge 127.

The upper arm 162 has a length $L_2$ which is substantially smaller than the length $L_1$ of the lower arm 165. With a corresponding adjustment of these lengths $L_1$ and $L_2$, an optimal use of the hydraulic force density and thus a very short-stroked embodiment of the cylinders 135, 136 can be achieved. Due to these short strokes of the piston 100, 101, the actuating device can be mounted within very small mounting spaces.

The pistons 122, 123 engage the bridge arms 128, 129 at the distance $L_3$ from the axis of the selector shaft 92. With a corresponding selection of the length $L_3$, an excellent adjusting precision upon rotation of the selector shaft 92 is achieved for a great length $L_3$. Furthermore, the diameters of the cylinder housings 138, 139 can be maintained small for a respectively long length $L_3$. The bridge arms 128, 129 are, of course, in the displacement direction of the selector shaft 92 of such a length that the pistons 122, 123 upon displacement of the selector shaft 92 will not lose contact with the bridge arms 128, 129. The cylinder housings 135, 136 provide the actuator 15 for selecting the gear and the cylinder housings 138, 139 provide the actuator 16 for selecting the gate.

The two cylinder housings 135, 136 are positioned on one side of the transmission lever 159. This actuating device is thus suitable for mounting situations in which only on one side of the transmission lever a corresponding mounting space is available. The cylinder housings 135, 136, 138, 139 and the bearing (axle) 171 including the transmission lever 159 can be combined to a mounting module.

As has been explained above, the cylinder housings with the pistons 100, 101, 122, 123 can be combined to a compact constructive unit. In such cases it is, of course, also possible and especially advantageous to provide within such a common housing, respectively, in such a common constructive unit also the required valves for switching the respective actuators.

Figure 46:
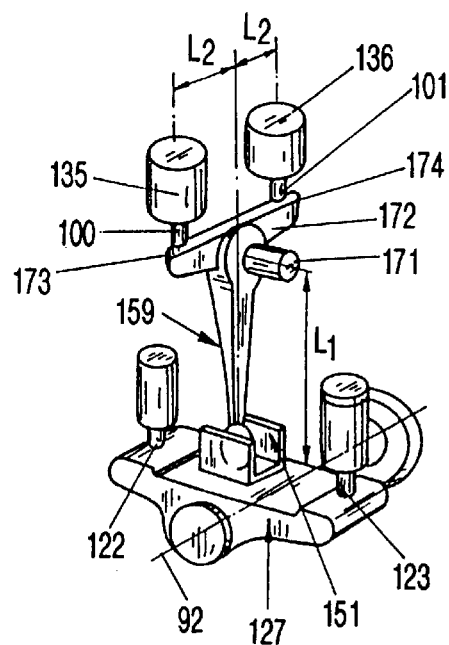
FIG. 46 shows in a perspective representation a further embodiment of the inventive actuating device for mounting according to FIG. 42.

In the embodiment according to FIG. 46 a further bridge 172 is provided instead of the upper arm 165. This bridge 172 extends perpendicularly to the lower bridge 127 that is rotationally fixedly and axially fixedly connected to the selector shaft 92. The bridge 172 thus extends also perpendicularly to the axle 171 of the transmission lever 159. The pistons 100, 101 of the cylinder housing 135, 136 engage the bridge arms 173, 174. The pistons 100, 101 extend perpendicularly to the selector shaft 92 and to the axle 171. In other respects, the actuating device is of the same construction as the previously disclosed embodiments.

In order to select the respective gate, the piston 122 or 123 is moved in the manner disclosed above so that the bridge 127 is rotated. Since it is connected rotationally fixed to the selector shaft 92, the selector shaft 92 is also rotated. Subsequently, the piston 100 or 101 is hydraulically moved in the aforedescribed manner so that the transmission lever 159 is pivoted about the axis of the axle 171. Since the transmission shaft 159 engages the U-shaped profiled member 151 that is fixedly connected to the bridge 127, the selector shaft 92 is displaced in the desired direction. In this actuating device an optimal use of the hydraulic force density for short strokes of the pistons 100 and 101 can be achieved with a corresponding adjustment of the lengths $L_1$ and $L_2$.

Figure 47:
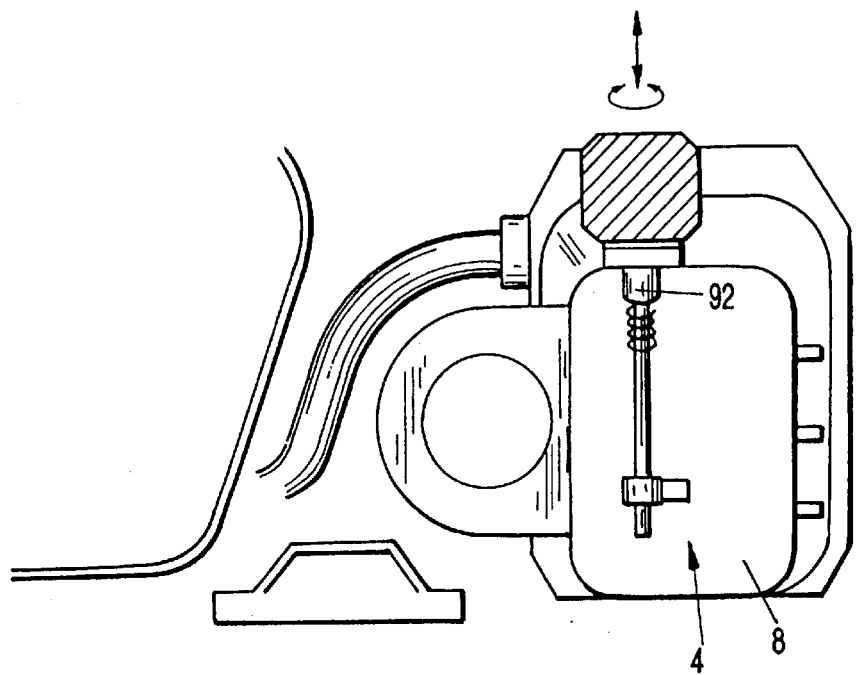
FIG. 47 shows in a schematic representation the forward part of a vehicle with a transversely mounted front engine having mounted thereto the inventive actuating device at the upper side of the transmission.

FIG. 47 shows the transmission 4 with the selector shaft 92 extending upwardly and projecting in the upward direction from the transmission housing 8. In this case, the adjusting device must be positioned in the narrow mounting space between the upper side of the transmission housing 8 and the hood of the vehicle.

Figure 48:
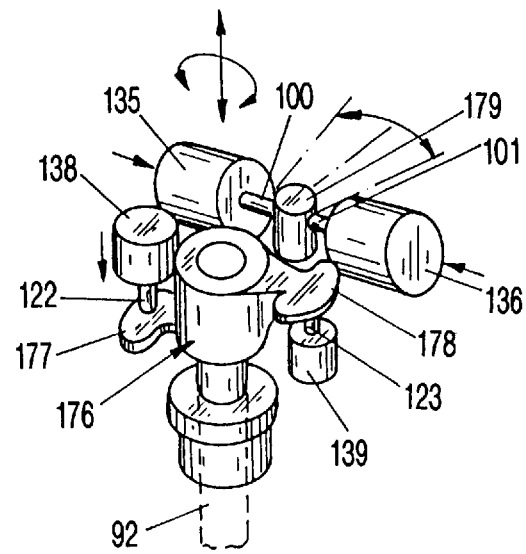
FIG. 48 shows the actuating device according to FIG. 47 in a perspective representation.

An advantageous embodiment of such an actuating device is shown in FIG. 48. On the upper end of the selector shaft 92 a coupling member 176 is positioned that has three radially extending arms 177, 178, 179. The two arms 177, 178 are axially staggered at the coupling member 176. In the axial direction of the coupling member 176, respectively, of the selector shaft 92 the arms 177, 178 are diametrically opposite one another. The free ends of the arms 177, 178 widen in the circumferential direction of the coupling member 176. The arm 177 is provided at the lower end of the sleeve-shaped coupling member 176 while the arm 178 is provided at the upper end of the coupling member 176. The piston 122 engages the widened end of the arm 177. The underside of the oppositely arranged arm 178 is engaged by the piston 123 of the cylinder housing 138, 139. The axes of the two pistons 122, 123 extend parallel to one another and parallel to the selector shaft 92.

The arm 179 extends perpendicularly to the two arms 177, 178. Its oppositely arranged sides are engaged by the pistons 100 and 101 of the cylinder housing 135, 136. The pistons 100, 101 extend perpendicularly to the pistons 122, 123 and perpendicularly to the selector shaft 92.

The pistons 100, 101 which are arranged in a horizontal plane, are selectively reciprocated in the aforedisclosed manner by the hydraulic medium so that the coupling member 176 is rotated about its axis by the arm 179. Since it is fixedly connected to the selector shaft 92, the selector shaft 92 is also rotated correspondingly. In this manner, the respective gear is selected.

In order to select the desired gate, the piston 122 or 123 is selectively moved so that via the corresponding arm 177, 178 the coupling member 176 and thus the selector shaft 92 is displaced in the desired direction. The widened ends of the arm 177, 178 are so wide that the pistons 122, 123 upon rotation of the selector shaft 92 will not lose contact with the arms 177, 178. Correspondingly, the arm 179 in the contacting area of the pistons 100, 101 in the displacement direction of the selector shaft 92 is of such a length that the pistons 100, 101 cannot become disengaged from the arm 179.

In all of the disclosed embodiments the cylinder housings, with which the respective gates are selected, can be embodied according to the design of FIGS. 8 and 9. However, this necessitates that centering in the neutral position is performed by springs. In a five gear transmission a simple piston arrangement is sufficient which has been shown, for example, in FIG. 8. For a six gear transmission, with a fourth gate $G_{IV}$ for the reverse gear, one of the cylinder housings must be provided with an auxiliary piston 69.

In transmissions in which the neutral position is not determined by springs, all of the disclosed embodiments require pistons for selecting the gates which are positioned in bushings. This has been explained, for example, with the aid of FIGS. 10 and 11. For a five gear transmission with three gates $G_I$ to $G_{III}$ a bushing is provided for each piston while for a six gear transmission (with a fourth gate $G_{IV}$ for the reverse gear) one piston with its bushing is positioned in an auxiliary piston.

Figure 49:
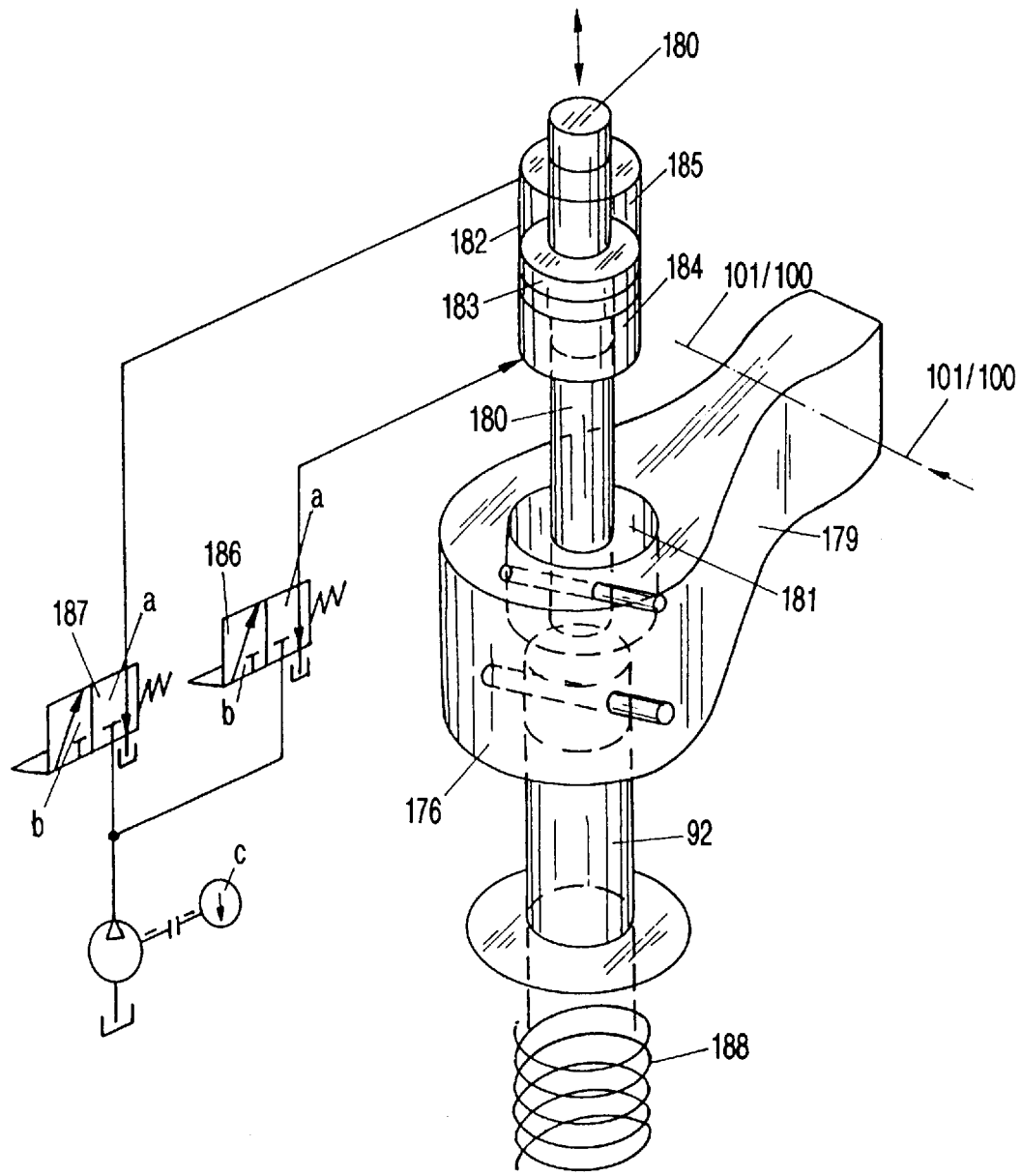
FIG. 49 shows a part of a further embodiment of the inventive actuating device.

FIG. 49 shows an adjusting device in which a sleeve-shaped coupling member 176 that is rotationally fixedly connected to the vertical selector shaft 92 has only one arm 179. The pistons 100, 101 (not represented) engage this arm as has been explained in connection with FIG. 48. Accordingly, the coupling member 176 and thus the selector shaft 92 are rotated in order to select the respective gear.

A piston rod 180 engages from above the coupling member 176 which is received in a sleeve 181 that is rotationally fixedly connected to the coupling member 176. The piston rod 180 projects from a cylinder 182 connected to the vehicle. The piston rod 180 extends upwardly with the same diameter from the cylinder. Within the cylinder 182 a piston 183 is positioned on the piston rod 180. The piston 183 separates two pressure chambers 184, 185 from one another. Both pressure chambers 184 and 185 are connected to switching solenoid valves 186, 187.

When the solenoid valve 186 is switched into position b, hydraulic medium is guided with pressure into the pressure chamber 184 so that the piston 183 is upwardly displaced. Since the piston rod 180 is axially fixedly connected via the coupling member 176 to the selector shaft 92, the selector shaft 192 is upwardly displaced counter to the force of a schematically represented centering spring 188. Meanwhile, the other solenoid valve 187 is switched in position a so that the pressure medium present within the pressure chamber 185 can be displaced into the tank.

When it is desired to displace the selector shaft 92 for selecting a corresponding gate in the downward direction, the solenoid valve 187 is switched into position b and the solenoid valve 186 is switched into position a. Thus, the piston 183 is downwardly displaced so that the piston rod 180 entrains the selector shaft 92.

When the two solenoid valves 186, 187 are switched into position a, the centering spring 188 returns the selector shaft 92 into the neutral, respectively, centered position.

This embodiment is characterized by a very compact design. In contrast to previously described embodiments, the actuator 182 is positioned on an extension of the selector shaft 92 and thus does not require mounting space lateral to the selector shaft.

Figure 50:
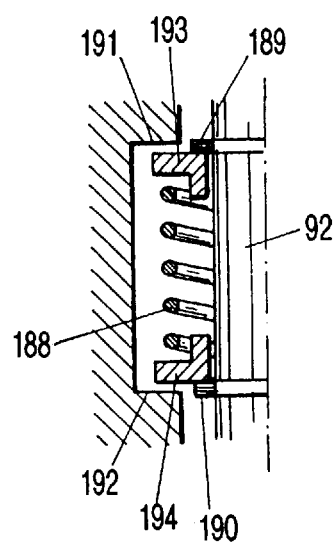
FIG. 50 shows in a longitudinal section one half of the centering device for the selector shaft according to FIG. 49.

FIG. 50 shows schematically the aforementioned spring centering action. Two abutments 189, 190 are positioned with axial spacing above one another on the selector shaft 92. The abutments 189, 190 are preferably embodied as Seeger rings. Between them are positioned spring plates 191, 192 surrounding the selector shaft 92 between which at least one centering spring 188, preferably in the form of a pressure spring, is provided. In the neutral or centered position represented in FIG. 50, the two spring plates 191, 192 are biased by the force of the centering spring 188 onto the abutments 189, 190 of the selector shaft 92. For correspondingly tolerances the spring plates 191, 192 can also abut abutments 193, 194 of the transmission under the force of the centering spring 188.

When the selector shaft 92 in FIG. 50 is upwardly displaced, the upper abutment 189 entrains the upper spring plate 191 counter to the force of the centering spring 188, while the lower spring plate 192 is supported at the abutment 194 of the transmission. Correspondingly, upon displacement of the selector shaft 92 in the upward direction, the lower spring plate 192 is entrained by the abutment 190 counter to the force of the centering spring 188, while the upper spring plate 191 is supported at the abutment 193 of the transmission. When the solenoid valves 186, 187 (FIG. 49) are switched into position a, the selector shaft 92 is returned by the force of the respectively prestressed centering spring 188 into the center position represented in FIG. 50.

In the embodiment according to FIGS. 49 and 50, the cylinder 182 can be combined with the non-represented cylinder housings for the pistons 100, 101 to a common housing, respectively, to a common constructive unit. Advantageously, the solenoid valves 186, 187 may be integrated in this common constructive unit.

The present invention is, of course, in no way restricted to the specific disclosure of the specification and drawings, but also encompasses any modifications within the scope of the appended claims.

What I claim is:

1. An actuating device for automatically operating a manual transmission of a vehicle, said actuating device comprising two spherically supported actuators for moving a gate change of a manual transmission in order to select a gate and a gear of the manual transmission, said actuating device further comprising a spherically supported transmission lever having two arms, wherein a first one of said arms engages said gate change, wherein each one of said actuators comprises a piston acting on a second one of said arms, wherein displacement of said pistons moves said transmission lever and said gate change.

2. An actuating device according to claim 1, wherein said first pistons are pivotably connected to said second arm.

3. An actuating device according to claim 2, wherein said first pistons have a ball at one end thereof and wherein said second arm comprises a coupling member having a ball receiving unit for each one of said balls, wherein said balls engage said ball receiving units.

4. An actuating device for automatically operating a manual transmission of a vehicle, said actuating device comprising two actuators for moving a gate change of a manual transmission in order to select a gate and a gear of the manual transmission, said actuating device further comprising a spherically supported transmission lever having two arms, wherein a first one of said arms engages said gate change, wherein each one of said actuators comprises a piston acting on a second one of said arms, wherein said second arm comprises a spherical end and wherein a first one of said actuators comprises a coupling member fixedly connected to said piston of said first actuator, said coupling member comprising a receiving unit and said spherical end supported in said receiving unit, wherein said coupling member has a ball head and wherein a second one of said actuators comprises a guide fixedly connected to said piston of said second actuator, wherein said ball head engages said guide.

5. An actuating device according to claim 4, wherein said guide is a U-shaped member having legs extending perpendicular to an axis of said first piston of said second actuator.

6. An actuating device for automatically operating a manual transmission of a vehicle, said actuating device comprising two actuators for moving a gate change of a manual transmission in order to select a gate and a gear of the manual transmission, said actuating device comprising a spherically supported transmission lever having two arms, wherein a first one of said arms engages said gate change, wherein each one of said actuators comprises a piston, wherein a second one of said arms comprises a spherical end and wherein a first one of said actuators comprises a slide connected to said piston of said first actuator so as to be displaceable by said piston of said first actuator, said slide comprising a receiving unit, wherein said spherical end is supported in said receiving unit, wherein a second one of said actuators has a support connected to said piston of said second actuator so as to be displaceable by said piston of said second actuator, wherein said slide is received in said support and is engaged by said support for displacing said slide perpendicularly to an axis of said piston of said first actuator.

7. An actuating device for automatically operating a manual transmission of a vehicle, said actuating device comprising four actuators for moving a gate change of a manual transmission in order to select a gate and a gear of the manual transmission, said actuating device comprising a spherically supported transmission lever having two arms, wherein a first one of said arms engages said gate change, wherein said four actuators are connected to said second arm and wherein said actuators are positioned at right angles to one another.

8. An actuating device according to claim 7, wherein said second arm has a spherical end and wherein said first pistons of said actuators engage said spherical end.

9. An actuating device according to claim 7, further comprising at least one auxiliary piston for receiving one of said first pistons.

10. An actuating device according to claim 9, wherein said first piston is displaceable in said auxiliary piston.

11. An actuating device according to claim 7, wherein said actuators have a pressure chamber and a bushing displaceably mounted in said pressure chamber, wherein said first pistons are received in said bushings.

12. An actuating device according to claim 11, wherein said first pistons are displaceable in said bushings.

13. An actuating device for automatically operating a manual transmission of a vehicle, said actuating device comprising at least two actuators for moving by rotation and translators movement a selector shaft of a manual transmission in order to select a gate and a gear of the manual transmission, wherein each one of said actuators comprises a first piston that upon displacement moves by rotation or translatory movement said selector shaft, wherein a first one of said actuators comprises a second piston extending parallel to said first piston and further comprises abutments for cooperating with said first and second pistons in an axial direction of said first and second pistons.

14. An actuating device according to claim 13, wherein said first actuator comprises a common housing for said first and second pistons.

15. An actuating device according to claim 14, further comprising a support rod to which said abutments for said first and second pistons are connected.

16. An actuating device according to claim 15, wherein said abutments are fixedly connected to said support rod.

17. An actuating device according to claim 15, wherein said support rod is displaceable by moving said first or said second piston outwardly relative to said common housing.

18. An actuating device according to claim 15, wherein said support rod is connected to said selector shaft.

19. An actuating device according to claim 13, wherein said abutments are axially fixedly connected to said selector shaft.

20. An actuating device according to claim 13, further comprising an actuating lever with a first and a second arm for rotating said selector shaft, wherein a second one of said actuators comprises a second piston extending parallel to said first piston, wherein said first piston engages said first arm and said second piston engages said second arm.

21. An actuating device according to claim 20, further comprising a support rod to which said abutments for said first and second pistons are connected, wherein said actuating lever is rotationally fixedly connected to said support rod.

22. An actuating device according to claim 20, wherein one of said abutments is said actuating lever.

23. An actuating device according to claim 20, wherein said actuating lever is rotationally fixedly connected to said selector shaft.

24. An actuating device according to claim 20, further comprising a coupling member arranged on said selector shaft and extending transversely to said selector shaft, wherein said coupling member has a ball head, said actuating lever has a ball receiving unit, and said ball head engages said ball receiving unit.

25. An actuating device for automatically operating a manual transmission of a vehicle, said actuating device comprising at least two actuators for moving by rotation and translatory movement a selector shaft of a manual transmission in order to select a gate and a gear of the manual transmission, wherein each one of said actuators comprises a first piston that upon displacement moves by rotation or translatory movement said selector shaft, further comprising a bridge element for connecting said actuating device to said selector shaft.

26. An actuating device according to claim 25, wherein said bridge element bridges a compensation element.

27. An actuating device for automatically operating a manual transmission of a vehicle, said actuating device comprising at least two actuators for moving by rotation and translatory movement a selector shaft of a manual transmission in order to select a gate and a gear of the manual transmission, wherein said actuating device further comprises a transmission lever having two arms, wherein a first one of said arms is connected to said selector shaft, wherein a first one of said actuators comprises a first and a second piston, wherein said second arm of said transmission lever has a first and a second abutment spaced from one another in a pivoting direction of said transmission lever and wherein said first piston engages said first abutment and said second piston engages said second abutment.

28. An actuating device according to claim 27, wherein:
said second arm has a third abutment with opposed sides;
a second one of said actuators has a second piston;
said first and said second pistons of said second actuator are positioned at a right angle to said first and second pistons of said first actuator and act on said opposed sides of said third abutment.

29. An actuating device for automatically operating a manual transmission of a vehicle, said actuating device comprising at least two actuators for moving by rotation and translatory movement a selector shaft of a manual transmission in order to select a gate and a gear of the manual transmission, wherein each one of said actuators comprises a first piston that upon displacement moves by rotation or translatory movement said selector shaft, said actuating device further comprising a coupling member positioned on said selector shaft and comprising three arms projecting therefrom, wherein said three arms are circumferentially spaced about said coupling member at an angle of 90° relative to one another.

30. An actuating device according to claim 29, wherein a first one of said actuators has a second piston and wherein two opposed ones of said three arms are acted upon by said first and second pistons for displacing said selector shaft.

31. An actuating device according to claim 30, wherein a second one of said actuators has a second piston and wherein said first and second pistons of said second actuator act on opposing sides of a third one of said three arms for rotating said selector shaft.

32. An actuating device for automatically operating a manual transmission of a vehicle, said actuating device comprising at least two actuators for moving by rotation and translators movement a selector shaft of a manual transmission in order to select a gate and a gear of the manual transmission, wherein each one of said actuators comprises a first piston that upon displacement moves by rotation or translatory movement said selector shaft, said actuating device further comprising a piston rod coaxially positioned to said selector shaft for displacing said selector shaft, said piston rod having connected thereto a piston housed within a cylinder housing connected to the vehicle.

33. An actuating device for automatically operating a manual transmission of a vehicle, said actuating device comprising four actuators positioned at right angles to one another for moving by rotation and translatory movement a selector shaft of a manual transmission in order to select a gate and a gear of the manual transmission, said actuating device further comprising a transmission lever rotationally and axially fixedly connected to said selector shaft, wherein each one of said actuators comprises a piston and wherein said pistons engage said transmission lever and, upon displacement of said pistons, pivot said transmission lever and move said selector shaft.

34. An actuating device for automatically operating a manual transmission of a vehicle, said actuating device comprising at least two actuators for moving by rotation and translatory movement a selector shaft of a manual transmission in order to select a gate and a gear of the manual transmission, wherein each one of said actuators comprises two pistons, said actuating device further comprising a transmission lever connected to said selector shaft, and further comprising a bridge connected fixedly to said selector shaft and having arms positioned on opposite sides of said selector shaft, wherein said pistons of a first one of said actuators engage said transmission lever and wherein said pistons of a second one of said actuators engage said arms of said bridge such that said pistons of said first actuator move said selector shaft in a translatory movement and said pistons of said second actuator rotate said selector shaft.

* * * * *